US012766443B2

(12) United States Patent
Irvin, Sr.

(10) Patent No.: US 12,766,443 B2
(45) Date of Patent: *Oct. 20, 2026

(54) INTAKE MODULE FOR WATER TREATMENT SYSTEMS

(71) Applicant: QWTIP LLC, Park City, UT (US)

(72) Inventor: Whitaker Ben Irvin, Sr., Kamas, UT (US)

( * ) Notice: Subject to any disclaimer, the term of this patent is extended or adjusted under 35 U.S.C. 154(b) by 237 days.

This patent is subject to a terminal disclaimer.

(21) Appl. No.: 18/755,482

(22) Filed: Jun. 26, 2024

(65) Prior Publication Data

US 2024/0342632 A1 Oct. 17, 2024

Related U.S. Application Data

(60) Division of application No. 18/133,334, filed on Apr. 11, 2023, which is a division of application No.
(Continued)

(51) Int. Cl.
*B01D 21/24* (2006.01)
*B01D 21/26* (2006.01)
(Continued)

(52) U.S. Cl.
CPC ........ *B01D 21/265* (2013.01); *B01D 21/2411* (2013.01); *B01D 21/262* (2013.01); *B01D 21/267* (2013.01); *B04C 5/08* (2013.01); *B04C 5/12* (2013.01); *C02F 1/38* (2013.01); *F04D 5/001* (2013.01); *B04C 2009/002* (2013.01);
(Continued)

(58) Field of Classification Search
CPC .. B01D 21/262; B01D 21/265; B01D 21/267; C02F 1/38; C02F 2301/026; B04C 5/08; B04C 2009/002
See application file for complete search history.

(56) References Cited

U.S. PATENT DOCUMENTS 699,636 A 5/1902 Thrupp
1,061,206 A 5/1913 Tesla
(Continued)

FOREIGN PATENT DOCUMENTS

AT 196680 3/1958
DE 1453730 A1 4/1970
(Continued)

OTHER PUBLICATIONS

Coats, Callum, "Living Energies," 2001, pp. 107-117, 156-192, 197-200, and 275-293.
(Continued)

*Primary Examiner* — Bradley R Spies
(74) *Attorney, Agent, or Firm* — Cahn & Samuels, LLP

(57) ABSTRACT

The invention in at least one embodiment includes a system for treating water having an intake module, a vortex module, a disk-pack module, and a motor module where the intake module is above the vortex module, which is above the disk-pack module and the motor module. In a further embodiment, a housing is provided over at least the intake module and the vortex module and sits above the disk-pack module. In at least one further embodiment, the disk-pack module includes a disk-pack turbine having a plurality of disks having at least one waveform present on at least one of the disks.

20 Claims, 20 Drawing Sheets

Related U.S. Application Data

17/498,349, filed on Oct. 11, 2021, now Pat. No. 11,628,384, which is a continuation of application No. 16/672,474, filed on Nov. 3, 2019, now Pat. No. 11,141,684, which is a continuation of application No. 15/651,090, filed on Jul. 17, 2017, now Pat. No. 10,463,993, which is a continuation of application No. 14/983,339, filed on Dec. 29, 2015, now Pat. No. 9,707,495, which is a continuation of application No. 14/240,396, filed as application No. PCT/US2012/052336 on Aug. 24, 2012, now abandoned.

(60) Provisional application No. 61/604,484, filed on Feb. 28, 2012, provisional application No. 61/526,834, filed on Aug. 24, 2011.

(51) Int. Cl.

| | |
|---|---|
| ***B04C 5/08*** | (2006.01) |
| ***B04C 5/12*** | (2006.01) |
| ***C02F 1/38*** | (2023.01) |
| ***F04D 5/00*** | (2006.01) |
| *B04C 9/00* | (2006.01) |

(52) U.S. Cl.
CPC .. *B04C 2009/005* (2013.01); *C02F 2301/026* (2013.01)

(56) References Cited

U.S. PATENT DOCUMENTS

| | | | |
|---|---|---|---|
| 1,374,446 | A | 4/1921 | Greenawalt |
| 1,383,937 | A | 7/1921 | Guthrie |
| 1,820,977 | A | 9/1931 | Imhoff |
| 2,087,834 | A | 7/1937 | Brown et al. |
| 2,173,580 | A | 9/1939 | Fawcett |
| 2,293,398 | A | 8/1942 | Meesook |
| 2,343,694 | A | 3/1944 | Mitchum |
| 2,514,039 | A | 7/1950 | Downward |
| 2,601,519 | A | 6/1952 | Hardy et al. |
| 2,657,802 | A | 11/1953 | Reed |
| 2,752,090 | A | 6/1956 | Kyselka |
| 3,260,039 | A | 7/1966 | Brown et al. |
| 3,487,784 | A | 1/1970 | Rafferty et al. |
| 3,498,454 | A | 3/1970 | Timson |
| 3,514,074 | A | 5/1970 | Self |
| 3,623,977 | A | 11/1971 | Reid |
| 3,632,221 | A | 1/1972 | Uehling |
| 3,664,268 | A | 5/1972 | Lucas et al. |
| 3,731,800 | A | 5/1973 | Timson |
| 4,042,351 | A | 8/1977 | Anderson |
| 4,118,207 | A | 10/1978 | Wilhelm |
| 4,172,034 | A | 10/1979 | Carlsson |
| 4,186,554 | A | 2/1980 | Possell |
| 4,201,512 | A | 5/1980 | Marynowski et al. |
| 4,350,236 | A | 9/1982 | Stahluth |
| 4,361,490 | A | 11/1982 | Saget |
| 4,371,382 | A | 2/1983 | Ross |
| 5,146,853 | A | 9/1992 | Suppes |
| 5,215,501 | A | 6/1993 | Ushikoski |
| 5,248,238 | A | 9/1993 | Ishida et al. |
| 5,254,250 | A | 10/1993 | Rolchigo et al. |
| 5,498,329 | A | 3/1996 | Lamminen et al. |
| 5,534,118 | A | 7/1996 | McCutchen |
| 5,744,004 | A | 4/1998 | Ekholm et al. |
| 5,769,069 | A | 6/1998 | Caffell |
| 5,778,695 | A | 7/1998 | Conner |
| 6,116,420 | A | 9/2000 | Horton |
| 6,227,795 | B1 | 5/2001 | Schmoll, III |
| 6,328,527 | B1 | 12/2001 | Conrad et al. |
| 6,517,309 | B1 | 2/2003 | Zaher |
| 6,682,077 | B1 | 1/2004 | Letourneau |
| 6,692,232 | B1 | 2/2004 | Letourneau |
| 6,719,817 | B1 | 4/2004 | Marin |
| 6,873,235 | B2 | 3/2005 | Fiske et al. |
| 6,890,443 | B2 | 5/2005 | Adams |
| 7,074,008 | B2 | 7/2006 | Motonaka |
| 7,341,424 | B2 | 3/2008 | Dial |
| 7,462,945 | B2 | 12/2008 | Baarman |
| 7,489,060 | B2 | 2/2009 | Qu et al. |
| 8,623,212 | B2 | 1/2014 | Irvin, Sr. et al. |
| 8,636,910 | B2 | 1/2014 | Irvin, Sr. et al. |
| 9,469,553 | B2 | 10/2016 | Irvin, Sr. |
| 9,474,991 | B2 | 10/2016 | Irvin, Sr. |
| 9,605,563 | B2 | 3/2017 | Chardonnet et al. |
| 9,605,663 | B2 | 3/2017 | Irvin, Sr. |
| 9,707,495 | B2 | 7/2017 | Irvin, Sr. |
| 9,714,176 | B2 | 7/2017 | Irvin, Sr. |
| 9,714,716 | B2 | 7/2017 | Cefai |
| 9,878,636 | B2 | 1/2018 | Irvin, Sr |
| 10,463,993 | B2 | 11/2019 | Irvin, Sr. |
| 10,464,824 | B2 | 11/2019 | Irvin, Sr. |
| 10,576,398 | B2 | 3/2020 | Irvin, Sr. |
| 10,682,653 | B2 | 6/2020 | Irvin, Sr. |
| 10,790,723 | B2 | 9/2020 | Irvin, Sr. |
| 10,807,478 | B2 | 10/2020 | Irvin, Sr. et al. |
| 11,045,750 | B2 | 6/2021 | Irvin, Sr. |
| 11,141,684 | B2 | 10/2021 | Irvin, Sr. |
| 11,192,798 | B2 | 12/2021 | Irvin, Sr. |
| 11,628,384 | B2 | 4/2023 | Irvin, Sr. |
| 2002/0195862 | A1 | 12/2002 | Kelly et al. |
| 2003/0106858 | A1 | 6/2003 | Elsom Sharpe |
| 2004/0009063 | A1 | 1/2004 | Polacsek |
| 2004/0107681 | A1 | 6/2004 | Carlsson et al. |
| 2004/0159085 | A1 | 8/2004 | Carlsson et al. |
| 2005/0019154 | A1 | 1/2005 | Dial |
| 2005/0169743 | A1 | 8/2005 | Hicks |
| 2005/0184007 | A1 | 8/2005 | Allard et al. |
| 2006/0000383 | A1 | 1/2006 | Nast |
| 2006/0054549 | A1 | 3/2006 | Schoendorfer |
| 2006/0233647 | A1 | 10/2006 | Saunders |
| 2006/0272624 | A1 | 12/2006 | Pettersson |
| 2007/0089636 | A1 | 4/2007 | Guardo, Jr. |
| 2007/0144956 | A1 | 6/2007 | Park et al. |
| 2008/0009402 | A1 | 1/2008 | Kane |
| 2008/0067813 | A1 | 3/2008 | Baarmanst |
| 2008/0168899 | A1 | 7/2008 | Decker |
| 2009/0078150 | A1 | 3/2009 | Hasegawa et al. |
| 2009/0200129 | A1 | 8/2009 | Houle et al. |
| 2009/0283007 | A1 | 11/2009 | Taylor |
| 2009/0314161 | A1 | 12/2009 | Al-Alusi et al. |
| 2010/0107647 | A1 | 5/2010 | Bergen |
| 2010/0129193 | A1 | 5/2010 | Sherrer |
| 2010/0180854 | A1 | 7/2010 | Baumann et al. |
| 2011/0038707 | A1 | 2/2011 | Blackstone |
| 2011/0266811 | A1 | 11/2011 | Smadja |
| 2011/0285234 | A1 | 11/2011 | Jang |
| 2014/0158614 | A1 | 6/2014 | Wang |
| 2014/0183144 | A1 | 7/2014 | Irvin, Sr. |
| 2015/0151649 | A1 | 6/2015 | Leung |
| 2018/0003163 | A1 | 1/2018 | Irvin, Sr. |
| 2020/0246726 | A1 | 8/2020 | Irvin, Sr. |
| 2021/0001355 | A1 | 1/2021 | Irvin, Sr. |
| 2021/0067000 | A1 | 3/2021 | Irvin, Sr. |
| 2021/0101487 | A1 | 4/2021 | Irvin, Sr. et al. |
| 2021/0322900 | A1 | 10/2021 | Irvin, Sr. |
| 2022/0033280 | A1 | 2/2022 | Irvin, Sr. |
| 2022/0089460 | A1 | 3/2022 | Irvin, Sr. |

FOREIGN PATENT DOCUMENTS

| | | | |
|---|---|---|---|
| EP | 0101770 | A1 | 3/1984 |
| EP | 1898100 | A1 | 8/2006 |
| EP | 1770717 | A1 | 4/2007 |
| GB | 1063096 | | 3/1967 |
| GB | 1187632 | | 4/1970 |
| GB | 1262961 | | 2/1972 |
| JP | 2009273967 | A | 11/2009 |
| JP | 2009276330 | A | 11/2009 |
| JP | 2009293984 | A | 11/2009 |
| SU | 1625829 | A1 | 2/1991 |
| WO | 96/41082 | A1 | 12/1996 |
| WO | 2004112938 | A1 | 12/2004 |

(56) References Cited

FOREIGN PATENT DOCUMENTS

| | | | |
|---|---|---|---|
| WO | 2008054131 | A1 | 5/2008 |
| WO | 2009010248 | A2 | 1/2009 |
| WO | 2009024154 | A1 | 2/2009 |
| WO | 2009109020 | A1 | 9/2009 |
| WO | 2010/085044 | A2 | 7/2010 |
| WO | 2013/029001 | A1 | 2/2013 |

OTHER PUBLICATIONS

Schauberger, Viktor, translated and edited by Callum Coats, "The Energy Evolution: Harnessing Free Energy from Nature," vol. 4 of the Eco-Technology Series, Mar. 2001, pp. 9-28, 62-63, 104-113, 130-142, 164-195, and 200-203.
Schauberger, Viktor, translated and edited by Callum Coats, "The Fertile Earth: Nature's Energies in Agriculture, Soil Fertilisation and Forestry," Volume Three of Eco-Technology Series, Mar. 2001, pp. 26-29, 39-43, 48-50, 57-68, and 72-74.
Guardian Trader, Genesis Vortex, http://guardiantrader.com/Genesis_Vortex.html, printed Jul. 12, 2011.
Natural Energy Works, "Wasserwirbler (Water Vortex Shower)", http://www.orgonclab.org/cart/yvortex.htm, printed Jul. 12, 2011.
Wikipedia, "Tesla Turbine," http://en.wikipedia.org/wiki/Tesla_turbine, printed Mar. 23, 2010.
Jens Fischer, "Original Martin-Wirbelwasser", http://fischer-wirbelwasser.de/Schauberger/schauberger.html, printed Jul. 12, 2011.
Wirbelwasser, "Was ist Wirbelwasser?", http://fischer-wirbelwasser.de/Wasserwirbler/Was_ist_Wirbelwasser/body_was_ist_wirbelwasser.html, printed Jul. 12, 2011.
European Patent Office, English Abstract for JP2009293984 (A), printed Mar. 14, 2013.
Fractal Water, LLC, "Structured Water is Fractal Water's Implosion Nozzle Vortex", copyrighted 2012, printed on Dec. 28, 2012 from http://www.fractalwater.com/vortex/.
Fractal Water, LLC, "Magnetic Water Treatment with the Fractal Water Super Imploder Magnetics", copyrighted 2012, printed on Dec. 28, 2012 from http://www.fractalwater.com/magnetics/.
Fractal Water, LLC, "Fractal Water: Vortex Magnetic Systems:: Physics of the Imploder Vortex Nozzle", copyrighted 2012, printed on Dec. 28, 2012 from http://www.fractalwater.com/science/physics-of-the-imploder-vortex-nozzle/.
Fractal Water, LLC, "Buy the Super Imploder from Fractal Water, Vortex Magnetic System", copyrighted 2012, printed on Dec. 28, 2012 from http://www.fractalwater.com/products/imploder-magnetic-water/.
Fractal Water, LLC, "Implosion Water Structured Vortex", copyrighted 2012, printed on Dec. 28, 2012 from http://www.fractalwater.com/products/tri-ploder-vortex/.
Fractal Water, LLC, "Fractal Water: Vortex Magnetic Systems :: Imploder Vortex Shower Head", copyrighted 2012, printed on Dec. 28, 2012 from http://www.fractalwater.com/products/imploder-vortex-shower-head/.
WIPO PCT International Preliminary Report on Patentability, PCT/US2012/052336, issued Feb. 25, 2014.
United States Patent and Trademark Office, U.S. Appl. No. 15/295,732 Office Action, dated Mar. 19, 2019.
European Patent Office, Communication pursuant to Article 94(3) EPC in EP Application No. 11 820 579.8, Aug. 29, 2019.
European Patent Office, English Machine Translation of SU1625829, printed Jan. 24, 2019.
European Patent Office, English Abstract for JP2009276330 (A), printed Mar. 14, 2013.
European Patent Office, English Abstract for JP2009273967 (A), printed Mar. 14, 2013.
U.S. Patent and Trademark Office, Office Action in U.S. Pat. U.S. Appl. No. 16/672,477, filed Jan. 29, 2021, p. 7.

INTAKE MODULE FOR WATER TREATMENT SYSTEMS

This application is a divisional application of U.S. patent application Ser. No. 18/133,334, filed on Apr. 11, 2023, which is a divisional application of U.S. patent application Ser. No. 17/498,349, filed on Oct. 11, 2021 and issued as U.S. Pat. No. 11,628,384, which is a continuation application of U.S. patent application Ser. No. 16/672,474, filed on Nov. 3, 2019 and issued as U.S. Pat. No. 11,141,684, which is a continuation application of U.S. patent application Ser. No. 15/651,090, filed on Jul. 17, 2017 and issued as U.S. Pat. No. 10,463,993, which is a continuation application of U.S. patent application Ser. No. 14/983,339, filed on Dec. 29, 2015 and issued as U.S. Pat. No. 9,707,495, which is a continuation application of U.S. patent application Ser. No. 14/240,396, filed on Feb. 23, 2014, now abandoned, which is a national stage entry of PCT Application No. PCT/US12/52336, filed on Aug. 24, 2012, which claims the benefit of U.S. provisional Application Ser. No. 61/526,834, filed on Aug. 24, 2011 entitled "Water Treatment System and Method for Use in Storage Containers" and U.S. provisional Application Ser. No. 61/604,484, filed on Feb. 28, 2012 entitled "Water Treatment System and Method for Use in Storage Containers". All of these of applications are hereby incorporated by reference.

I. FIELD OF THE INVENTION

The invention in at least one embodiment relates to an intake module for use in a system and method for use in treating water.

II. SUMMARY OF THE INVENTION

The invention provides in at least one embodiment a system including a motor module having a base; a disk-pack module having a disk-pack turbine in rotational engagement with the motor module; a vortex module in fluid communication with the disk-pack turbine; an intake module in fluid communication with the vortex module; a plurality of conduits connecting the vortex module to the intake module; and a plurality of support members connected to the disk-pack module, the vortex module, and the intake module such that the intake module is above the vortex module and the disk-pack module. In a further embodiment, the system further includes a housing cover connected to at least one of the plurality of support members, the housing cover including a bottom opening and a cavity in which the intake module and the vortex module reside, and wherein the housing cover and a top surface of the disk-pack module are spaced from each other forming a passageway in fluid communication with the bottom opening, and wherein a fluid pathway runs from the passageway through the opening and the cavity to the intake module. In either of the above embodiments, the system is installed in a water storage container.

The invention provides in at least one embodiment a system including a motor module having a base; a disk-pack module having a disk-pack turbine in rotational engagement with the motor module; a vortex module in fluid communication with the disk-pack turbine; an intake module in fluid communication with the vortex module; a plurality of conduits connecting the vortex module to the intake module; and a plurality of support members connected to the disk-pack module and the vortex module, and at least one of the plurality of conduits and the plurality of support members is connected between the vortex module and the intake module such that the intake module is above the vortex module and the disk-pack module. In a further embodiment, the system further includes a housing over at least some of the components or substantially all of the components where the housing can be selected from any of the various housings described and/or illustrated in this disclosure. In a further embodiment to any of the previous embodiments, the system further includes any of the means for filtering as described and/or illustrated in this disclosure. In a further embodiment to any of the previous embodiments, the intake module includes an intake screen with a plurality of openings, an intake housing defining an intake chamber, and a plurality of intake outlets in fluid communication with the intake chamber with each intake outlet in fluid communication with the vortex module through a respective conduit. In a further embodiment to any of the previous embodiments, the vortex module includes a housing defining a vortex chamber with an outlet axially aligned with the disk-pack turbine, and a plurality of inlets in fluid communication with the vortex chamber. In a further embodiment to any of the previous embodiments, the motor module includes a motor and a driveshaft connected to the motor and the disk-pack turbine in any of the ways described and/or illustrated in this disclosure. In a further embodiment to any of the previous embodiments, the disk-pack module includes a turbine housing defining an accumulation chamber in which the disk-pack turbine resides; and a discharge housing defining a discharge chamber in fluid communication with the accumulation chamber through a discharge channel and a discharge outlet in fluid communication with the discharge chamber. In a further embodiment to any of the previous embodiments, the disk-pack module further includes a supplemental inlet in fluid communication with the accumulation chamber. In a further embodiment to the previous two embodiments, the accumulation chamber includes an expanding discharge channel around its periphery from a first point to a discharge passageway leading to the discharge chamber. In a further embodiment to any of the previous three embodiments, the accumulation chamber is at least one of a modified torus shape or a scarab shape, which may include the golden mean. In a further embodiment to the previous five embodiments, the discharge housing includes at least one of a spiral protrusion running around a wall of the discharge chamber in an upward direction towards said discharge outlet and a spiral protrusion running around a wall of the discharge chamber in a downward direction towards the particulate discharge port. In a further embodiment to the prior embodiment, the discharge outlet includes a radius flared outwardly wall. In a further embodiment to any of the previous embodiments, the disk-pack turbine includes a plurality of non-flat disks. In a further embodiment to any of the previous embodiments in this paragraph, the disk-pack turbine includes a plurality of disks each having at least two waveforms present between a center of the disk and a periphery of the disk. In a further embodiment to any of the previous two embodiments, the waveform is selected from a group consisting of sinusoidal, biaxial sinucircular, a series of interconnected scallop shapes, a series of interconnected arcuate forms, hyperbolic, and/or multi-axial including combinations of these. In a further embodiment to any of the previous three embodiments, the disk-pack turbine includes a plurality of wing shims connecting the disks. In a further embodiment to any of the previous embodiments in this paragraph, the disk-pack turbine includes a top rotor and a lower rotor. In a further embodiment to the previous embodiment, the top rotor and the lower rotor include cavities.

The invention provides in at least one embodiment a system including a motor; a disk-pack module having a housing having a cavity, and a disk-pack turbine in rotational engagement with the motor, the disk-pack turbine located within the cavity of the housing, the disk-pack turbine having a plurality of disks spaced apart from each other and each disk having an axially centered opening passing therethrough with the plurality of openings defining at least in part an expansion chamber; a vortex module having a vortex chamber in fluid communication with the expansion chamber of the disk-pack turbine; a plurality of conduits in fluid communication with the vortex chamber of the vortex module; an intake module having a whirlpool chamber in fluid communication with the vortex chamber through the conduits; and a plurality of support members connected to the disk-pack module and the vortex module, and at least one of the plurality of conduits and the plurality of support members is connected between the vortex module and the intake module such that the intake module is above the vortex module and the disk-pack module. In a further embodiment, the system further includes a discharge housing defining a discharge chamber in fluid communication with the disk-pack housing cavity (or accumulation chamber) through a discharge channel and a discharge outlet in fluid communication with the discharge chamber. In a further embodiment to any of the previous embodiments, the cavity in the housing includes an expanding discharge channel around its periphery from a first point to a discharge passageway leading to the discharge chamber. In a further embodiment to any of the previous embodiments, the cavity of the housing is at least one of a modified torus shape or a scarab shape, which may include the golden mean. In a further embodiment to any of the previous embodiments, the disk-pack turbine includes a plurality of non-flat disks. In a further embodiment to any of the previous embodiments in this paragraph, the disk-pack turbine includes a plurality of disks each having at least two waveforms present between a center of the disk and a periphery of the disk. In a further embodiment to any of the previous two embodiments, the waveform is selected from a group consisting of sinusoidal, biaxial sinucircular, a series of interconnected scallop shapes, a series of interconnected arcuate forms, hyperbolic, and/or multi-axial including combinations of these. In a further embodiment to any of the previous three embodiments, the disk-pack turbine includes a plurality of wing shims connecting the disks. In a further embodiment to any of the previous embodiments in this paragraph, the disk-pack turbine includes a top rotor and a lower rotor. In a further embodiment to the previous embodiment, the top rotor and the lower rotor include cavities.

The invention provides in at least one embodiment a method of operation for each of the above-described system embodiments.

The invention provides in at least one embodiment a method including drawing water into a whirlpool chamber for creation of a whirlpool allowing particulate, precipitated matter and/or concentrated solids present in the water to drop from the water as the water enters at least one of a plurality of conduits; forming a vortex flow of the water in a vortex chamber that receives the water from the plurality of conduits, wherein the vortex chamber is located below the whirlpool chamber; discharging the water into an expansion chamber defined in a disk-pack turbine; channeling the water between spaces that exist between disks of the disk-pack turbine to travel from the expansion chamber to an accumulation chamber surrounding the disk-pack turbine; routing the water through the accumulation chamber to a discharge chamber; and forming a vortical flow of the water up through the discharge chamber back into an environment from which the water was drawn and a downward flow of particulate and/or precipitated matter to a particulate discharge port. In a further embodiment, the method further includes drawing water into a housing that encloses the whirlpool chamber and the vortex chamber where the housing draws the water from below a height of the vortex chamber. In a further embodiment to any of the previous embodiments, the method further includes removing solids from the whirlpool chamber, which in at least one embodiment causes particulate matter to concentrate at the center and descend and be ejected through a solids port at the bottom of the whirlpool chamber. In a further embodiment to any of the previous embodiments, the vortical flow of the water includes a significant volume of vortical solitons that are produced by the system and flow into the environment containing the water.

Given the following enabling description of the drawings, the system should become evident to a person of ordinary skill in the art.

III. BRIEF DESCRIPTION OF THE DRAWINGS

The present invention is described with reference to the accompanying drawings. In the drawings, like reference numbers indicate identical or functionally similar elements. The use of cross-hatching (or lack thereof) and shading within the drawings is not intended as limiting the type of materials that may be used to manufacture the invention.

Figure 30A:
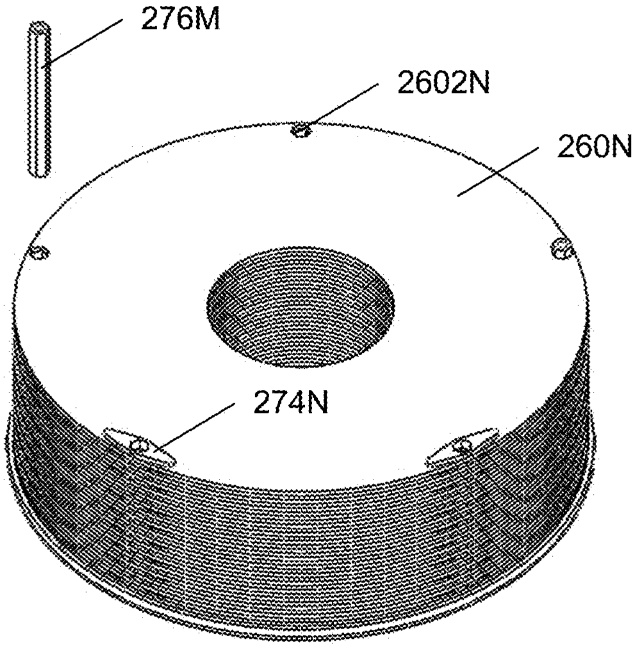
Figure 30B:
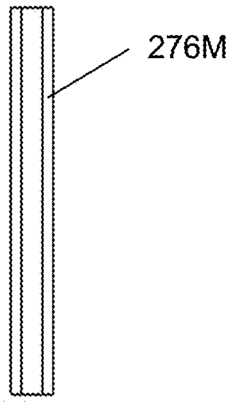
Figure 30C:
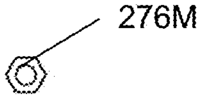

FIG. 30A illustrates an alternative wing shim embodiment installed in a partial disk-pack. FIG. 30B illustrates a side view of a support member of the wing shim illustrated in FIG. 30A. FIG. 30C illustrates a top view of a support member of the wing shim illustrated in FIG. 30A.

Figure 31A:
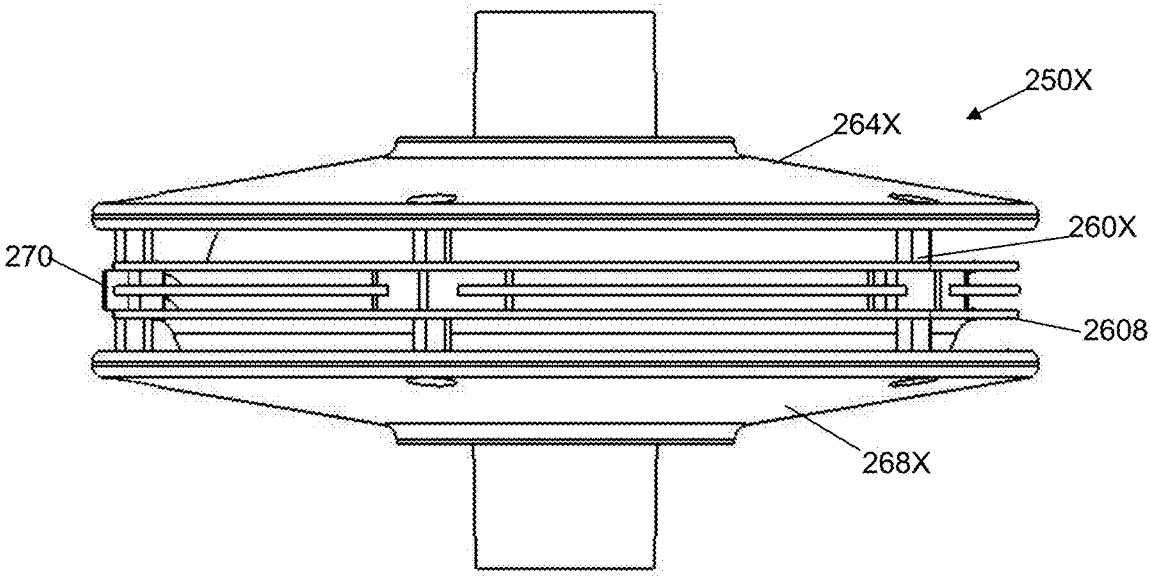
Figure 31B:
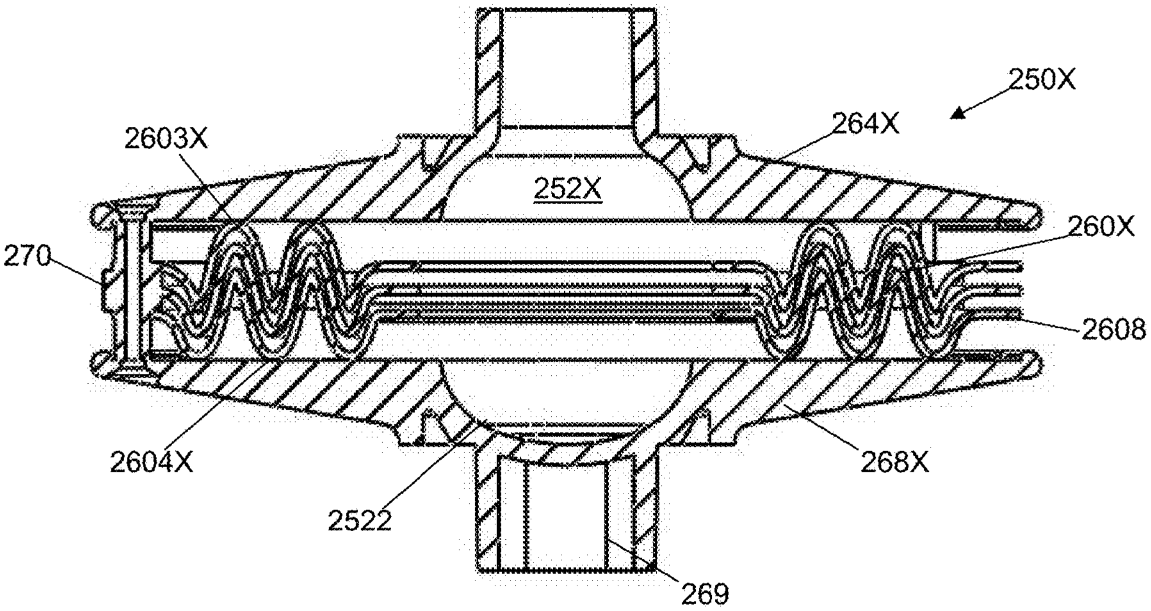

FIGS. 31A and 31B illustrate a waveform disk pack turbine example according to at least one embodiment of the invention.

FIGS. 32A-32E illustrate a waveform disk pack turbine example according to at least one embodiment of the invention.

Figure 33:
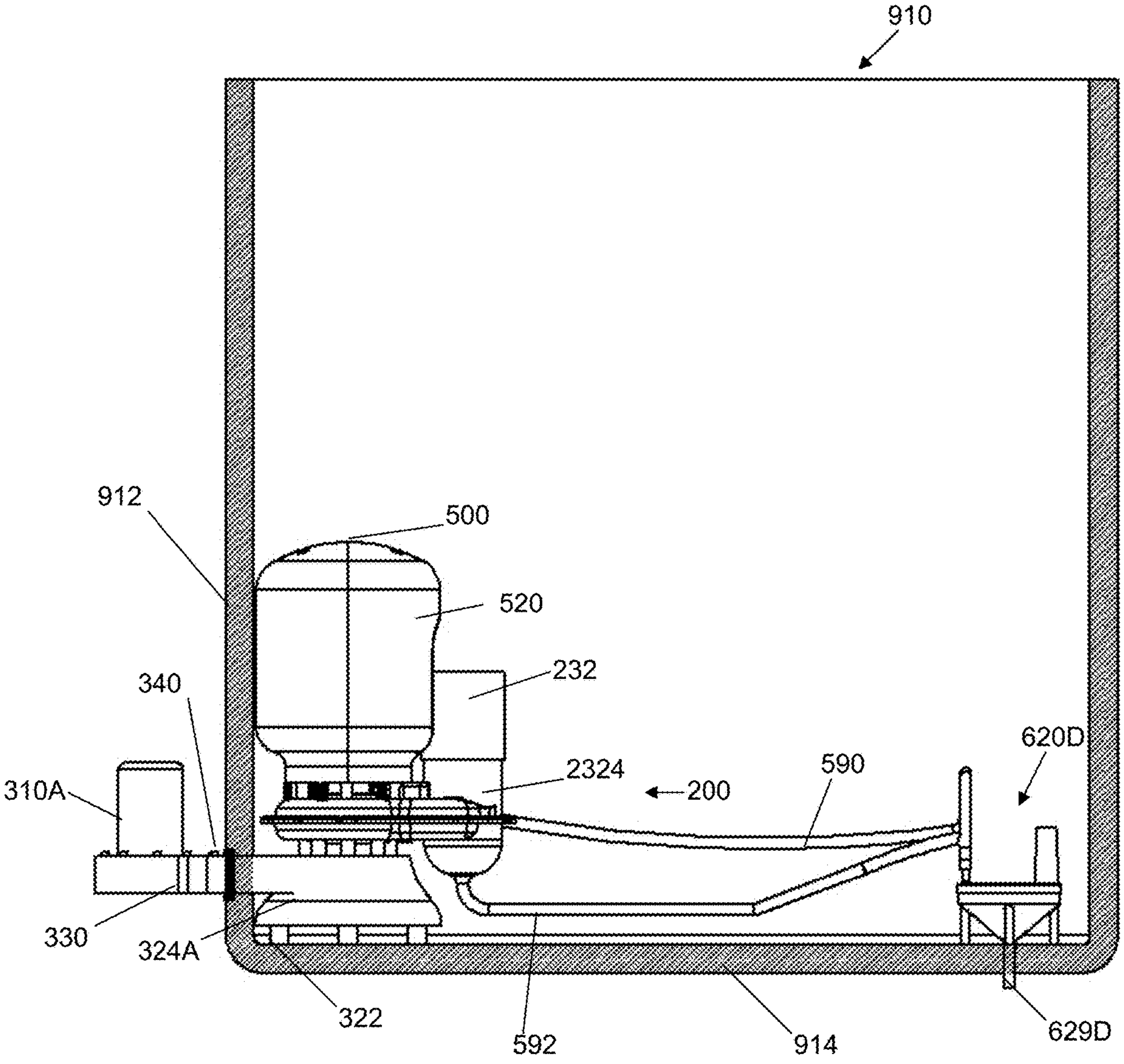

FIG. 33 illustrates another embodiment according to the invention.

Figure 34A:
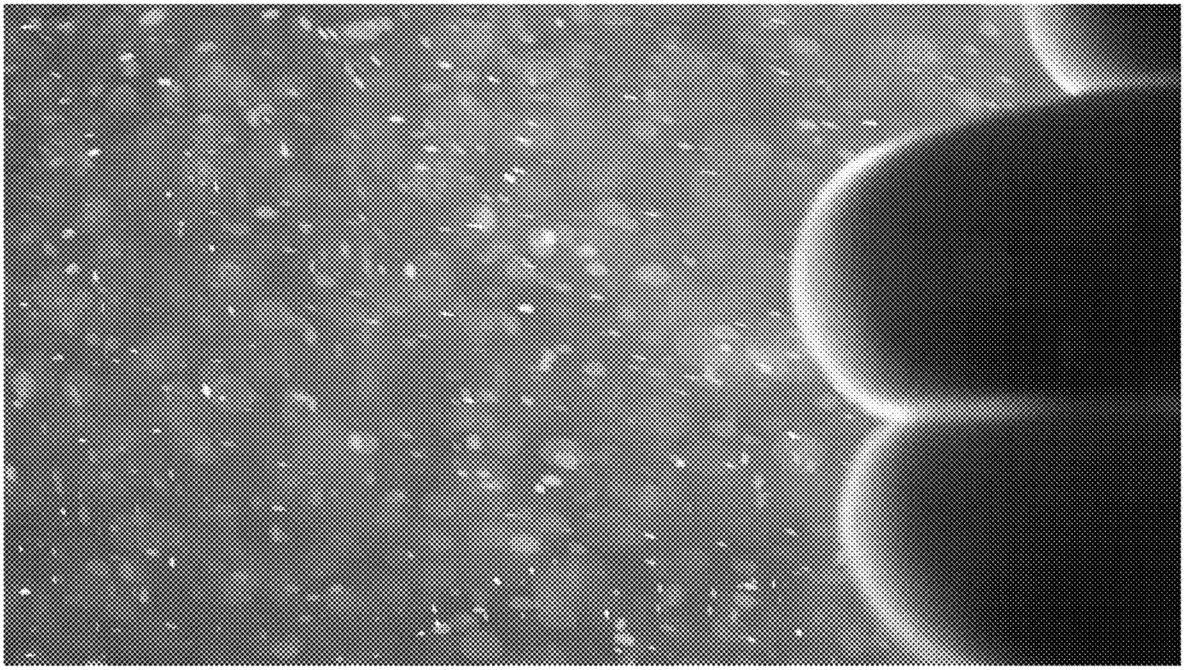
Figure 34B:
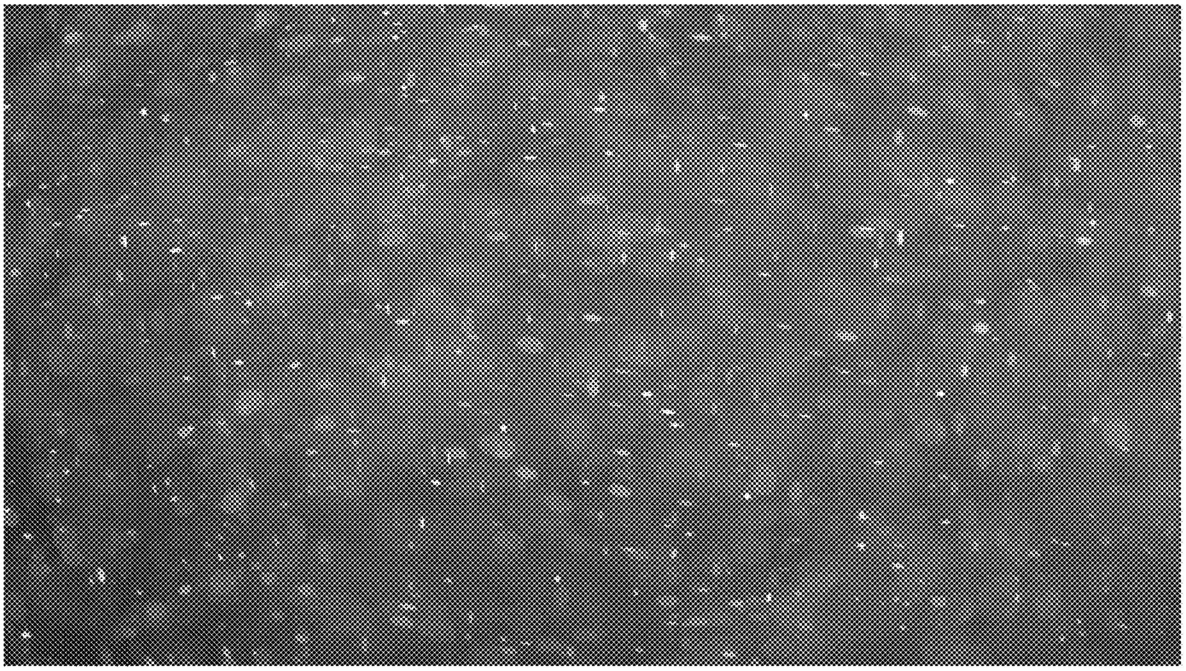

FIGS. 34A and 34B depict images of the water after it exits the discharge outlet of a prototype built according to at least one embodiment of the invention.

IV. DETAILED DESCRIPTION OF THE DRAWINGS

FIGS. 1-12B illustrate example embodiments according to the invention. The illustrated systems in at least one embodiment are for treating water that is relatively free of debris such as water present in water storage containers and systems, pools, industrial process systems, cooling towers and systems, municipal and/or tanker supplied water, and well water that are examples of environments from which water can be drawn. In further embodiments, there are additional filter structures around the intakes of the water treatment system such as a screen box or ring and/or filter material. Although the non-limiting embodiments described herein are directed at water, water should be understood as an example of a fluid, which covers both liquids and gases capable of flowing through a system. The illustrated system includes a housing module 500, an intake module 400, a vortex module 100, a disk-pack module 200, and a motor module 300. Although not illustrated, the housing module 500 in at least one embodiment further includes additional structure built around the system to cover and hide components of the system from visual inspection as illustrated, for example, in FIG. 13.

Most of the illustrated and discussed systems have similar modes of operation that include drawing water into a whirlpool (or intake) chamber for creation of a whirlpool allowing particulate, precipitated matter and/or concentrated solids present in the water to drop from the water as the water enters at least one of a plurality of conduits that connect to a vortex chamber where a vortex flow, which in at least one embodiment is a vortex, of the water is formed prior to being discharged into an expansion chamber present in a disk-pack turbine. The water is channeled away from the expansion chamber into the spaces that exist between disks of the disk-pack turbine to travel to an accumulation chamber surrounding the disk-pack turbine where the water is accumulate and circulated into a discharge channel that leads to a discharge chamber. The discharge chamber in at least one embodiment forms a vortical flow of the water up through the discharge chamber back into an environment from which the water was drawn and a downward flow of particulate and/or precipitated matter to a particulate discharge port. In some further embodiments, the mode of operation includes drawing water into a housing that at least substantially encloses the whirlpool chamber and the vortex chamber where the housing draws the water from below a height of the vortex chamber such as around the disk-pack turbine module or from below an elevated base of the motor module. In a further embodiment to any of the previous embodiments, the method further includes removing solids from the whirlpool chamber, which in at least one embodiment causes particulate matter to concentrate at the center and descend and be ejected through a solids port at the bottom of the whirlpool chamber. In a further embodiment to any of the previous embodiments, the vortical flow of the water includes a significant volume of vortical solitons that are produced by the system and flow into the environment containing the water.

FIGS. 1-6 illustrate an example of a housing module 500 including a cover 520 that covers the intake module 400 and the vortex module 100. The housing module 500 as illustrated, for example, in FIG. 5 includes a plurality of support members 524 and 526 that align and support the vortex module 100, the intake module 400, and the cover 520. The support members (or bosses) 524 in at least one embodiment are incorporated into a top of the disk-pack housing 220 and spaced around it forming a substantially circular pattern (although other arrangements could be used) as illustrated, for example, in FIG. 11A. The support members 526 attach to the support members 524 and extend up through connection points such as mounting ears and/or holes 119 (see, e.g., FIG. 7) on the vortex housing 120, the intake housing 420 and the cover 520 and stop at either the vortex housing 120 or the intake housing 420. In at least one embodiment the support members 524 are connected to at least one housing/cover with bolts, screws, adhesive, interlocking engagement such as threaded or keyed sections, and the like as illustrated, for example, in FIGS. 5 and 6. In at least one embodiment, the support members 526 do not all extend up to the cover 520. In further embodiments, the support members 526 are multi-part. In a further embodiment as illustrated, for example, in FIG. 10, the support members do not run between the vortex housing 120 and the intake housing 420, but instead the conduits 490 provides the support between these housings. In a still further embodiment, the support members 526 are omitted from above the intake housing 420 and the cover 520 is supported by posts extending up from the disk pack housing 220 or it rests on the disk pack housing 220 or another housing structure. In a still further embodiment, the support members 526 act as guide rails for lowering the vortex module 100 as illustrated, for example, in FIG. 9 and the intake module 400 onto the disk-pack module 200 and in a further embodiment the cover 520 is attached to the top or proximate to the top of the support members 526.

Figure 1:
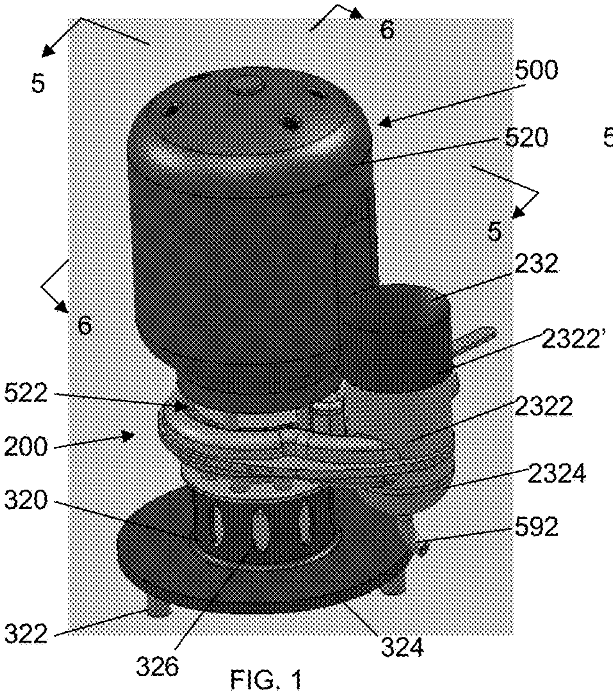
FIGS. 1-4 illustrate a variety of external views of an embodiment according to the invention.
Figure 2:
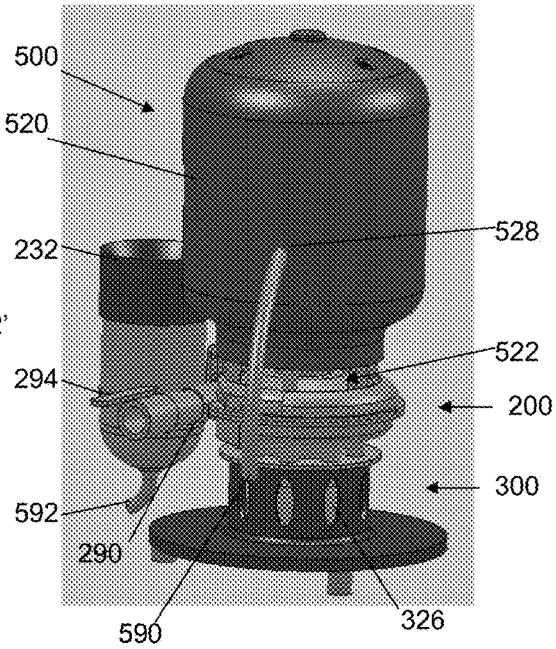
Figure 3:
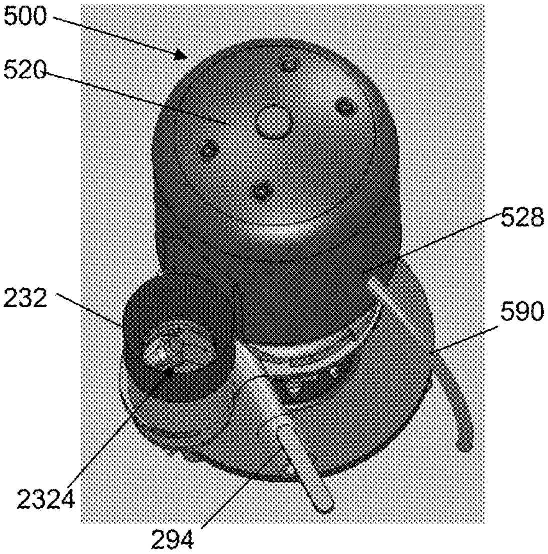
Figure 4:
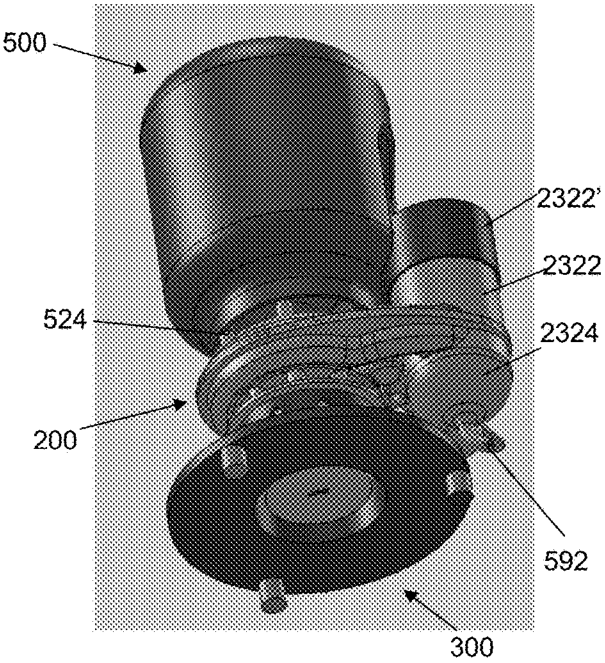

In the illustrated embodiment in FIG. 1, the cover 520 includes a recessed area around the discharge outlet (or discharge manifold) 232 to allow for the flow of water up and away from the discharge outlet 232. Based on this disclosure, it should be appreciated that the discharge outlet 232 could be spaced further from the cover 520 resulting in the recessed area being smaller or omitted entirely. In a further embodiment, the discharge outlet 232 extends further up along the cover 520. In a still further embodiment, the discharge outlet 232 extends above the cover 520.

In addition, the cover 520 of the housing module 500 and the top of the disk-pack module 200 define the inlet (or opening) 522 for water to be pulled into the system as illustrated, for example, in FIG. 1. In a further embodiment, the cover 520 is fitted against the disk pack turbine module 200 or a further housing as illustrated, for example, in FIG. 13 to draw water from a lower area in the container (e.g., below the intake module and/or the vortex module) in which the system is operating where water is drawn up from below the system through a plurality of openings 532 present in the top of a lower cover 530 illustrated, for example, in FIG. 14 and a plurality of openings 542 present in a bottom plate 540 illustrated, for example, in FIG. 15. In yet further embodiments, the cover 520 may take a variety of other shapes to that illustrated in the Figures such as a substantially box shape, a fulcrum shape, and a substantially spherical shape. In at least one embodiment, the cover 520 allows for operation of the system in shallower water than the height of the intake catch 425. In at least one embodiment, the larger and heavier solids that are present in the water that make it past, for example, the inlet 522 or the openings 542 will drop out of the upward flow of the water within the cover 520.

Figure 5:
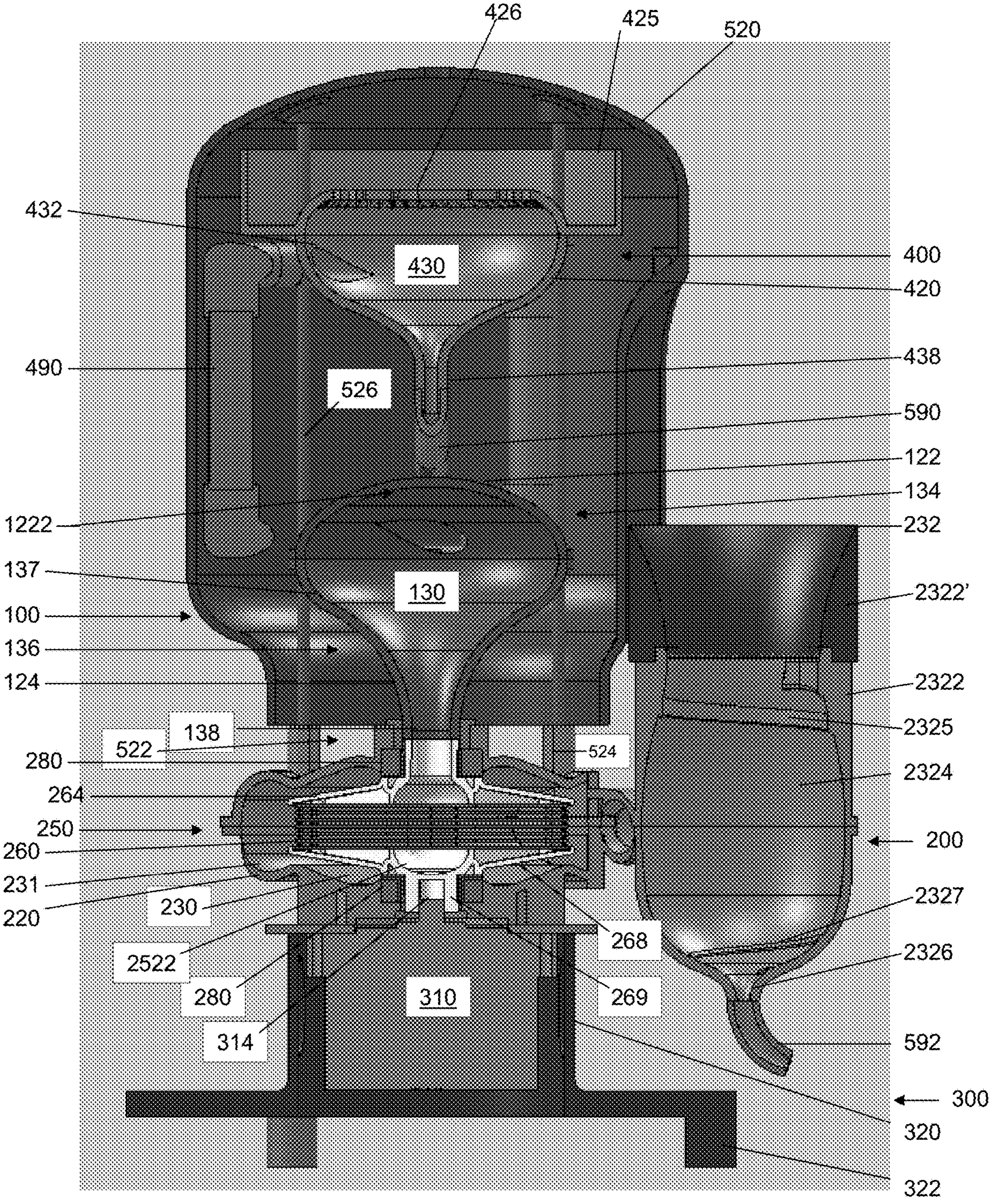
FIGS. 5 and 6 illustrate different cross-sections of the embodiment illustrated in FIGS. 1-4 and are taken at 5-5 and 6-6, respectively, in FIG. 1.
Figure 6:
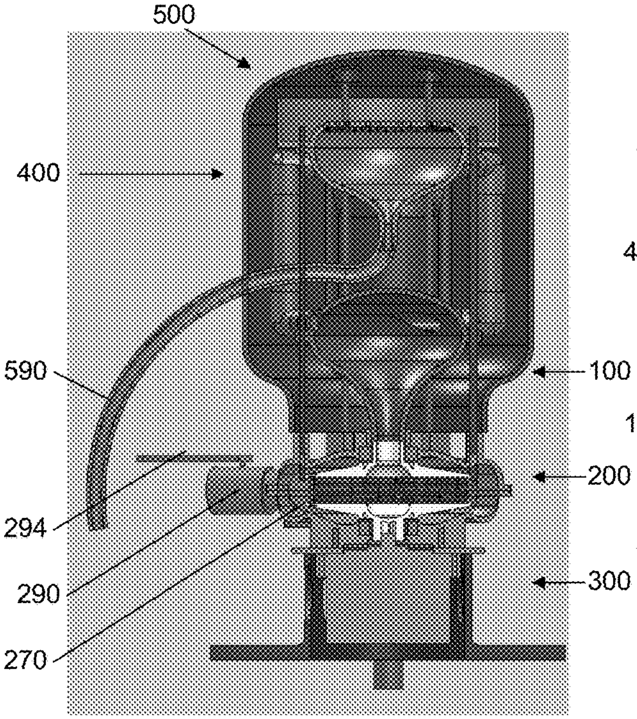

The water flows in at the inlet 522 (or through the openings 542) and up to an intake catch 425 as illustrated, for example, in FIGS. 5 and 6. The water after entering the intake catch 425 enters into the intake chamber 430 through the intake screen 426, which forms a substantial portion of the bottom of the intake catch 425 as illustrated, for example, in FIG. 7. The screen blocks material and other debris above a certain size based on the size of the openings in the screen 426.

Figure 10:
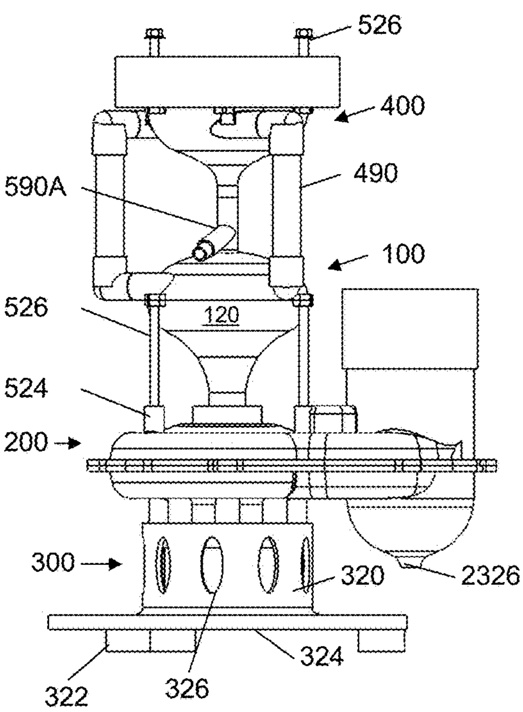
FIG. 10 illustrates an alternative (without a cover) to the embodiment illustrated in FIGS. 7-9.

As illustrated, for example, in FIG. 5, the intake chamber 430 includes a substantially paraboloid shape upper section that narrows into a solids outlet 438 to collect particulate, precipitated solids, and/or concentrated solids from the intake chamber 430. In at least one embodiment, the chamber shape encourages rotational movement in the water to form a whirlpool in the intake chamber 430 with a funnel shape from the negative pressure in the disk pack turbine 250 pulling through the vortex chamber 130 and the conduits 490, and the resulting whirlpool precipitates solids present in the water into the solids outlet 438. The solids outlet 438 in at least one embodiment connects to a hose (or conduit) 590 that is routed out through an opening 528 in the cover 520 (see, e.g., FIGS. 2 and 3). In at least one embodiment, the precipitated solids are deposited external to the system. In a further embodiment, the conduit 590 travels to a point external to the environment in which the system is installed, while in other embodiments a catch (or precipitated collection) container 600 (see, e.g., FIGS. 23A-27) or other type of catch container (see, e.g., FIGS. 28-29B) is used to collect the precipitated solids for later removal. An alternative example of the conduit 590A is illustrated in FIG. 10 where the conduit also acts as a support between the intake chamber 430 and the vortex chamber 130.

As illustrated, for example, in FIG. 5, near the top of the intake chamber 430, there are a plurality of outlets 432 connected to the conduits 490. The outlets 432 in at least one embodiment extend tangentially away from the intake chamber 430 in a counterclockwise direction as illustrated, for example, in FIG. 7. Although the conduits 490 are illustrated as pipes, based on this disclosure it should be appreciated that the conduits can take a variety of forms while still providing a passageway connecting the outlets 432 to the vortex chamber inlets 132. One alternative for the illustrated conduits 490 is the use of flexible conduit. In a still further embodiment, the conduits 490 could spiral around to one of the other vortex inlets instead of as illustrated, for example, in FIGS. 7-10.

As illustrated, for example, in FIGS. 5 and 6, the vortex induction chamber 130 is a cavity formed inside a housing 120 of the vortex module 100 to shape the in-flowing water into a through-flowing vortex that is fed into the disk-pack module 200. The illustrated vortex chamber 130 includes a structure that funnels the water into a vortex upper section 134 having a bowl (or modified concave hyperbolic) shape for receiving the water that opens into a lower section 136 having a conical-like (or funnel) shape with a steep vertical angle of change that opens into the disk-pack module 200. The vortex chamber 130 in at least one embodiment serves to accumulate, accelerate, stimulate and concentrate the water as it is drawn into the disk-pack module 200 via centrifugal suction. In at least one embodiment, the vortex chamber 130 is formed by a wall 137. The sides of the wall 137 follow a long radial path in the vertical descending direction from a top to an opening 138 that reduces the horizontal area defined by the sides of the wall 137 as illustrated, for example, in FIG. 5.

As illustrated, for example, in FIGS. 5 and 6, the illustrated housing 120 of the vortex module 100 includes a two-part configuration with a cap 122 and a main body 124. The cap 122 and the main body 124 can be attached in a variety of ways including, for example, with screws, bolts, adhesive, interlocking engagement such as threaded or keyed sections, the support members 526, etc. In at least one embodiment, the cap 122 and the main body 124 form the vortex inlets 132 when assembled together. In an alternative embodiment, the cap 122 is illustrated as having the top portion of the vortex chamber 130 formed by a concentric concave depression 1222 on the inside face of the cap 122. The cap 122 and the main body 124 together form the plurality of vortex inlets 132. Based on this disclosure, one of ordinary skill in the art should understand that the vortex housing could have different configurations of housing components while still providing a vortex chamber in which a vortex flow can be established.

The main body 124 is illustrated as having a passageway passing vertically through it to form the lower portion 136 of the vortex chamber 130. The main body 124 in at least one embodiment is attached to the disk-pack housing 220 with the same support members 526 used to attach the cap 122 to the main body 124 as illustrated, for example, in FIGS. 5-9. Other examples for attaching the main body 124 to the disk-pack module 200 include adhesive, screws, and interlocking engagement such as threaded or keyed sections, and friction engagement. In at least one embodiment, the main body 124 sits in and/or on the disk pack turbine module 200.

In at least one embodiment illustrated, for example, in FIG. 5, as the rotating, charging water passes through the base discharge opening 138 of the vortex induction chamber 130 it is exposed to a depressive/vacuum condition as it enters into the revolving expansion and distribution chamber (or expansion chamber) 252 in the disk-pack module 200 as illustrated, for example, in FIGS. 5 and 6. The disk-pack module 200 includes (or forms) the revolving expansion chamber 252 that is illustrated as having an oval/elliptical/ egg-shape chamber that includes a curved bottom portion provided by a rigid feature 2522 incorporated into the bottom rotor 268 of the disk-pack turbine 250 in at least one embodiment. Most of the volumetric area for the expansion chamber 252 is formed by the center holes in the separated stacked disks 260 which serve as water inlet and distribution ports for the stacked disk chambers 262 where each chamber is formed between two neighboring disks. The top portion of the expansion chamber 252 roughly mirrors the bottom with the addition of an opening passing through an upper rotor 264 that is bordered by a curved structure. The opening is centered axially with the vortex induction chamber outlet 138 above it as illustrated, for example, in FIG. 5, providing a pathway through which the water can pass between the two respective chambers. In at least one embodiment, the expansion chamber 252 has a substantially egg shape.

An example of a disk-pack turbine 250 is illustrated in FIGS. 5 and 6. The illustrated disk-pack turbine 250 includes the top rotor 264, a plurality of stacked disks 260, and the bottom rotor 268 having a concave radial depression 2522 that provides a bottom for the expansion chamber 252. The illustrated bottom rotor 268 includes a motor hub 269, which in some embodiments may be integrally formed with the bottom rotor 268. The motor hub 269 provides the interface to couple the disk-pack turbine 250 to the drive shaft 314 extending from the motor module 300 as illustrated, for example, in FIG. 5. The top rotor 264, the bottom rotor 268, and/or the motor hub 269 are coupled to the housing 220 with a bearing element (or a bushing) 280 or have a bearing incorporated into the piece to allow for substantially reduced rotational friction of the disk-pack turbine 250 relative to the housing as driven by the drive shaft 314 and the motor 310.

Centrifugal suction created by water progressing from the inner disk-pack chamber openings, which are the holes in the center of the disks 260 illustrated, for example, in FIG. 5, toward the periphery of the disk chambers 262 establishes the primary dynamics that draw, progress, pressurize and discharge fluid from the disk-pack turbine 250. The viscous molecular boundary layer present on the rotating disk surfaces provides mechanical advantage relative to impelling water through and out of the disk-pack turbine 250.

In at least one embodiment, the disk-pack turbine includes a plurality of wing-shims 270 (illustrated in FIG. 6) spaced near (or at) the outer edge of the individual disks 260. Examples of wing-shims are provided in U.S. patent application Ser. No. 13/213,614 published as U.S. Pat. App. Pub. No. 2012/0048813, which is hereby incorporated by reference in connection with the disclosed wing-shims 270 et seq. The wing-shims provide structure and support for the disks 260 in the disk-pack turbine 250 and in at least one embodiment are responsible for maintaining disk positions and separation tolerances. The disk separation provides space (or disk chambers) 262 through which water travels from the expansion chamber 252 to the accumulation chamber 230. In an alternative embodiment, the wing shims are located around and proximate to the expansion chamber 252. In at least one embodiment, the wing shims assist the creation of a negative pressure without sheering of or forming cavitations in the water and assist the movement of the water into the accumulation chamber.

The disk-pack turbine 250 is held in place by the housing 220 of the disk-pack module 200 as illustrated, for example, in FIG. 5. The housing 220 includes an accumulation chamber 230 in which the disk-pack turbine 250 rotates. The accumulation chamber 230 is illustrated, for example, in FIGS. 5, 6, and 11A-12B as having a modified torus shape or scarab shape, which may include the golden mean, (or in an alternative embodiment a hyperbolic paraboloid cross-section) that leads to a discharge outlet 232 on the outside periphery of the housing 220. In this illustrated embodiment, there is one discharge outlet 232, but one or more discharge outlets 232 may be added and, in at least one embodiment, the discharge outlets 232 are equally spaced around the housing periphery.

Once the fluid passes through the disk-pack turbine 250, it enters the accumulation chamber 230 in which the disk-pack turbine 250 rotates. The accumulation chamber 230 is an ample, over-sized chamber within the disk-pack module 200 as illustrated, for example, in FIG. 5. The accumulation chamber 230 gathers the fluid after it has passed through the disk-pack turbine 250. The highly energetic water with concentrated mixed motion smoothly transitions to be discharged at low pressure and low linear velocity (with a large velocity in at least one embodiment within the motion including micro-vortices) through the discharge outlet 232 back into the environment from which the water was taken. As illustrated, for example, in FIGS. 5 and 6, the shape of the accumulation chamber 230 is designed to provide its shortest height proximate to the perimeter of the disk-pack turbine 250. Beyond the shortest height there is a discharge channel 231 that directs the water around to the discharge outlet 232 and also in at least one embodiment provides for the space to augment the water in the accumulation chamber 230 through an optional supplemental inlet 290. The discharge channel 231 has a substantially elliptical cross-section (although other cross-sections are possible) as illustrated, for example, in FIG. 5. The accumulation chamber wall in at least one embodiment closes up to the perimeter of the disk pack turbine 250 at a point proximate to the discharge channel 231 exits the accumulation chamber 230 to provide a passageway that travels towards a discharge chamber 2324.

Figure 11A:
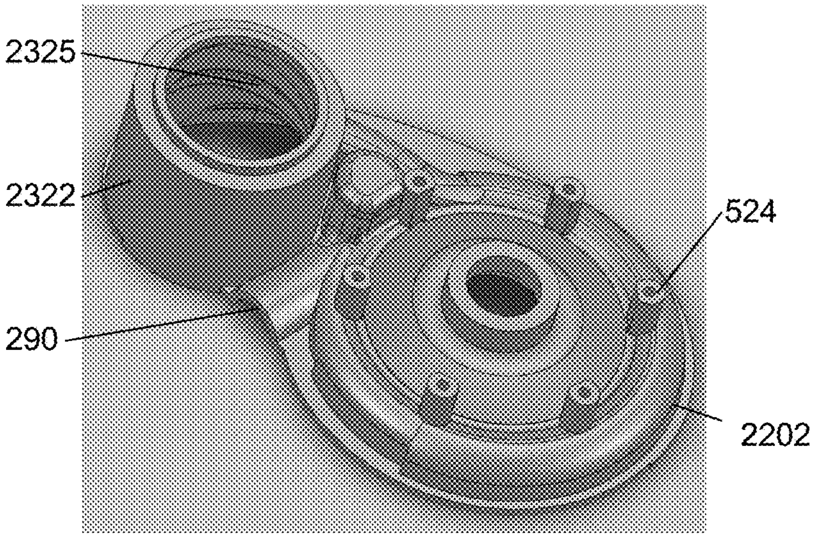
FIGS. 11A-11C illustrate views of an upper disk-pack turbine housing including a top view, a cross-section view, and a bottom view.
Figure 11B:
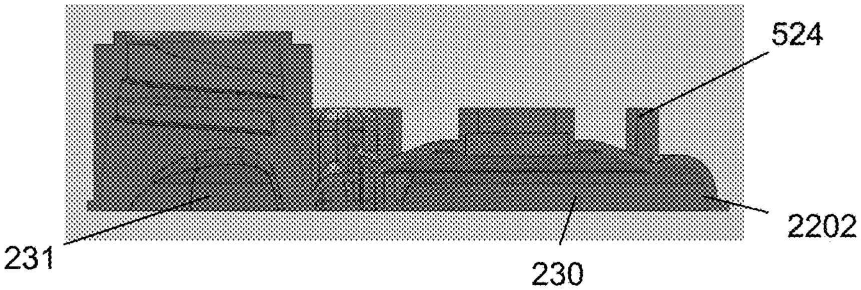
Figure 11C:
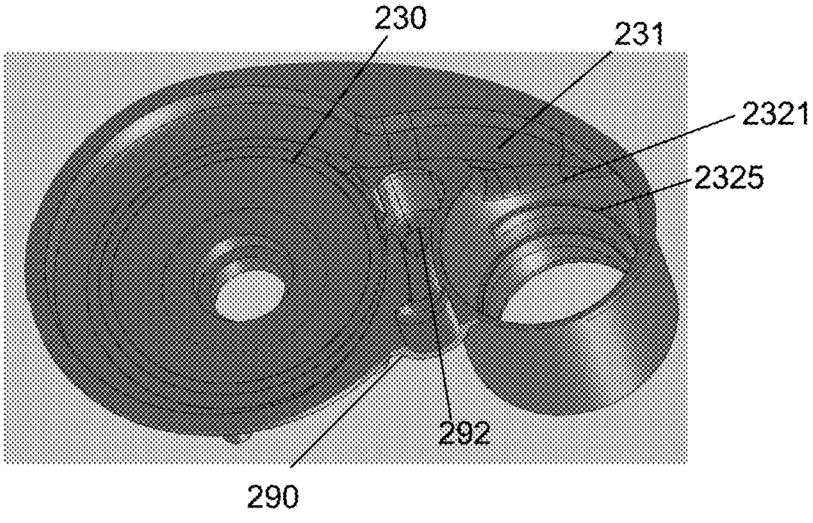
Figure 12A:
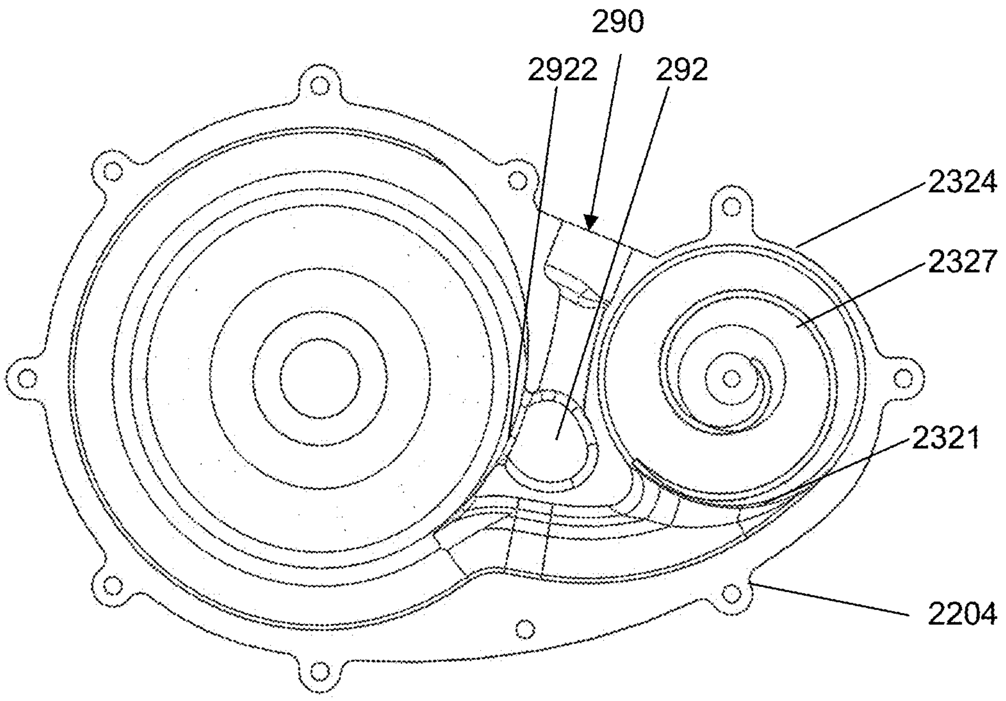
FIGS. 12A and 12B illustrate views of a lower disk-pack turbine housing including a top view and a side view.
Figure 12B:
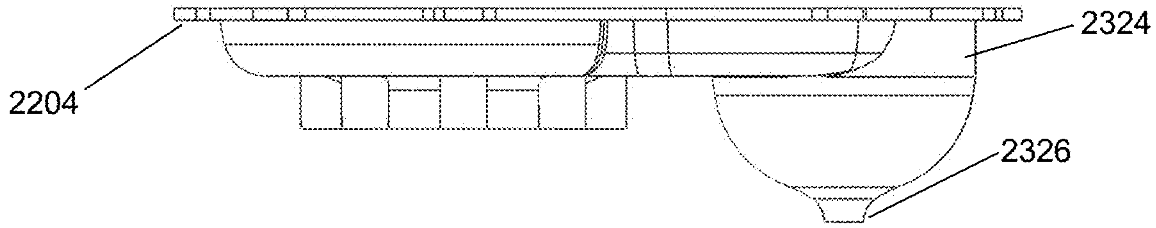

The illustrated housing 220 includes a top section 2202 and a bottom section 2204 that together form the housing and the illustrated accumulation chamber 230 with a discharge channel 231 extending substantially around the periphery of the accumulation chamber 230. FIGS. 11A-11C illustrate the top section 2202, while FIGS. 12A and 12B illustrate the bottom section 2204. As illustrated in FIG. 12B, the bottom section 2204 includes a particulate discharge port 2326 that in at least one embodiment includes a spiraling protrusion 2327 illustrated, for example, in FIG. 12A.

FIGS. 11A-12B illustrate the presence of the supplemental inlet 290 into the accumulation chamber 230 to augment the water present in the accumulation chamber 230. As illustrated, the supplemental inlet 290 enters the accumulation chamber 230 at a point just after the discharge channel 231 extends away from the accumulation chamber 230 to route fluid towards the discharge chamber 2324. As illustrated in FIG. 12A, the supplemental inlet 290 includes a curved bottom 2922 that extends out from an inlet feed chamber 292 into the start of the discharge channel 231 as it expands and travels in a counter-clockwise direction away from the accumulation chamber 230 and the supplemental inlet 290. In at least one embodiment, the inlet feed chamber 292 shapes the incoming flow of water from the supplemental inlet 290 to augment the counter-clockwise flow of water in the accumulation chamber 230 and the discharge channel 231. In at least one embodiment, this is accomplished by the creation of a vortical flow in the inlet feed chamber 292. In at least one embodiment, the supplemental inlet 290 includes an optional valve 294 to control the level of augmentation as illustrated, for example, in FIGS. 2 and 3.

Although the value 294 is illustrated as being a manual valve, it should be understood based on this disclosure that the valve could be electronically controlled in at least one embodiment. In a further embodiment the supplemental inlet 290 is omitted as it is being an optional component to the illustrated system.

As illustrated, for example, in FIG. 5, the discharge outlet 232 includes a housing 2322 having a discharge chamber 2324 that further augments the spin and rotation of the water being discharged as the water moves upwards in an approximately egg-shaped compartment. In an alternative embodiment, the output of the discharge outlet 232 is routed to another location other than from where the water was drawn into the system from. In at least one embodiment as illustrated, for example, in FIGS. 4 and 5, the housing 2322 includes an upper housing 2322', which can be a separate piece or integrally formed with housing 2322 that defines an expanding diameter cavity for discharging the water from the system. The discharge chamber 2324 includes a particulate discharge port 2326 that connects to a conduit 592 to remove from the system, for example, particulate, precipitated matter and/or concentrated solids that have precipitated out of the water during processing and to route it away from the system in at least one embodiment. In at least one embodiment, the shape of the discharge chamber 2324 facilitates the creation of a vortex exit flow for material out through the particulate discharge port 2326 and a vortex exit flow for the water out through the discharge outlet 232 forming multiple vortical solitons that float up and away from the discharge outlet 232 spinning and in many cases maintaining a relative minimum distance amongst themselves as illustrated in FIGS. 34A and 34B. The vortical solitons in this embodiment continue in motion in the container in which they are discharged until they are interrupted by another object.

In at least one embodiment, the discharge chamber 2324 includes at least one spiraling protrusion 2325 (illustrated, for example, in FIGS. 5 and 11C) that extends from just above (or proximate) the intake (or discharge port or junction between the passageway coming from the accumulation chamber 230 and the discharge chamber 2324) 2321 (see FIG. 11C) into the discharge chamber 2324 up through or at least to the discharge outlet 232 (and/or upper housing 2322' illustrated in, for example, FIG. 5) to encourage additional rotation in the water prior to discharge. In at least one embodiment, the spiraling protrusion 2325 extends up through the discharge outlet 232. The spiraling protrusion 2325 in at least one embodiment spirals upward in a counterclockwise direction when viewed from above; however, based on this disclosure it should be appreciated that the direction of the spiral could be clockwise, for example, if these system were used in the southern hemisphere.

In at least one embodiment, the discharge chamber 2324 includes at least one (second or particulate) spiraling protrusion 2327 that extends from just below and/or proximate to the intake 2321 down through the discharge chamber 2324 towards the particulate discharge port 2326 as illustrated, for example, in FIG. 12A. When viewed from above in FIG. 12A, the spiraling protrusion 2327 spirals in a counter-clockwise direction; however, based on this disclosure it should be appreciated that the direction of the spiral could be clockwise, for example, if the system were used in the southern hemisphere. Based on this disclosure, it should be understood that one or both of the spiraling protrusions 2325, 2327 could be used in at least one embodiment. In an alternative embodiment to the above protrusion embodiments, the protrusions are replaced by grooves formed in the discharge chamber wall.

As illustrated in FIG. 5, the discharge chamber's diameter shrinks as it approaches the upper housing 2322', which as illustrated includes a long radii expanding back out to decompress the discharged water for return to the storage tank or other water source. In an alternative embodiment, the long radii begins proximate to the intake 2321 in the discharge chamber 2324. This structure in at least one embodiment provides for a convergence of flow of water prior to a divergence back out of the flow of water.

The base of the systems illustrated, for example, in FIGS. 1-10B is the motor module 300 that includes a housing 320 with an outwardly extending base 324 having a plurality of feet 322 spaced around the periphery of the base 324 to provide support and distribute the weight of the system out further to provide stability in at least one embodiment. The motor housing 320 substantially encloses the motor 310; however, as illustrated in FIGS. 1, 2, 10, and 13, there may be multiple openings 326 through which water can pass and cool the motor in at least one embodiment. The motor housing 320 provides the base on which the disk-pack module 200 rests and is connected to by bolts or the like connection members.

Figure 16A:
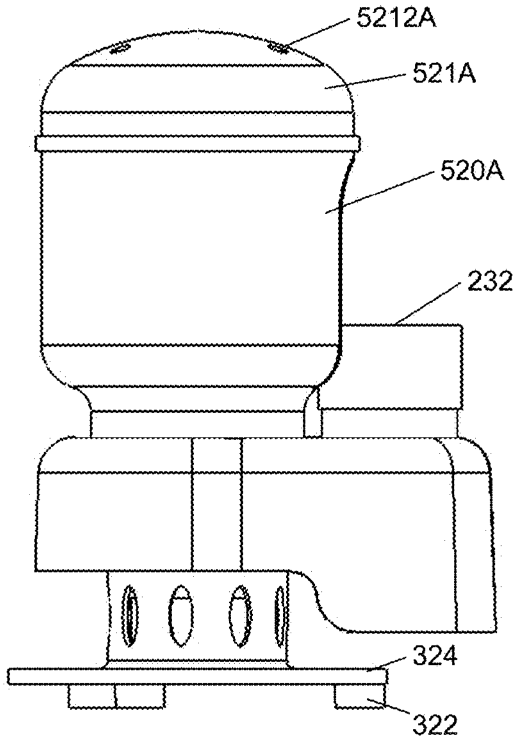
FIGS. 16A and 16B illustrates side and top views of another cover embodiment according to the invention.
Figure 16B:
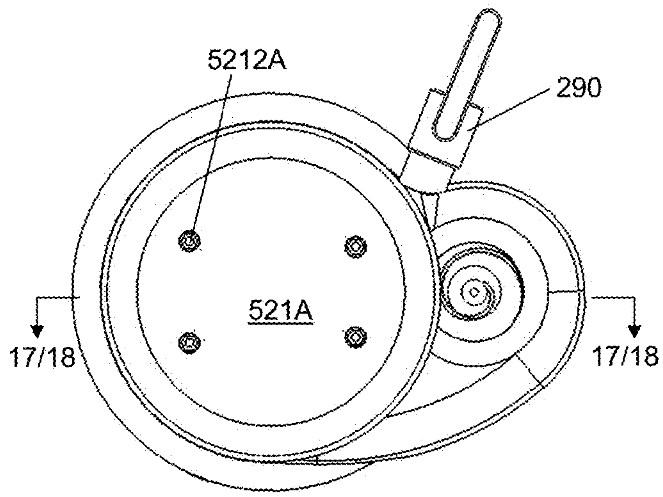
Figure 17:
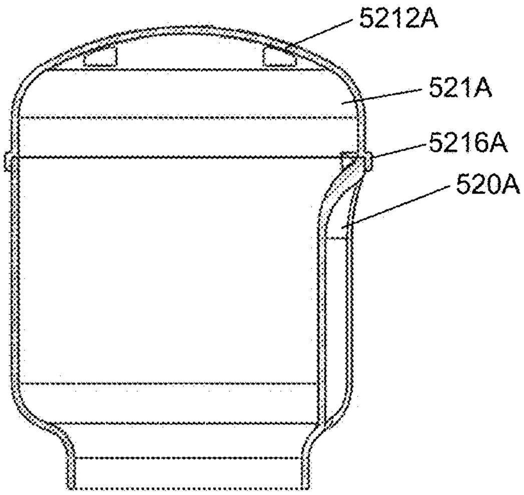
FIG. 17 illustrates a cross-section of a cover according to an embodiment of the invention taken at 17/18-17/18 in FIG. 16B.
Figure 18:
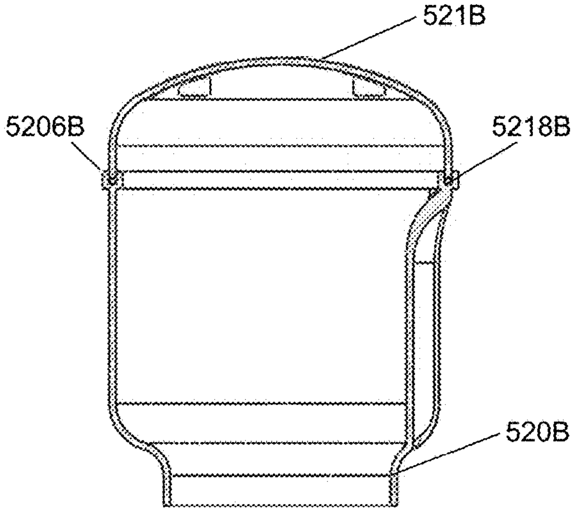
FIG. 18 illustrates a cross-section of another cover according to an embodiment of the invention taken at 17/18-17/18 in FIG. 16B.

FIGS. 16A-18C illustrate additional housing module embodiments according to the invention. FIGS. 16A and 16B illustrate a side and top view of a cover configuration embodiment that would cover the examples illustrated in FIGS. 17 and 18. The cover is separated into a base cover 520A and an upper cover 521A that are joined on a horizontal plane such as proximate to the top of the discharge port recess in the cover 520A. There are a variety of ways to hold the base cover 520A and the upper cover 521A together including, for example, frictional fit; adhesives or sealants; a plurality of screws, bolts, and/or rivets spaced around the perimeter of the joining area between the components; and/or downward pressure provided by the attachment of the upper cover 521A to support members present within the cover at optional bosses 5212A with these examples including or not including a O-ring or other gasket. FIG. 16A also provides an illustration of the base cover 520A attached to, connected to or abutting the lower cover 530. FIG. 17 illustrates an example of where the upper cover 521A includes a lip (or flange) that fits over the top of the base cover 520A. Although an O-ring is not illustrated, an O-ring could be added to the engagement area to further seal the cover. FIG. 18 illustrates a base cover 520B that includes around its top a channel 5206B for receiving a bottom of the upper cover 521B and an optional O-ring 5218B. These illustrated covers allow for the upper cover to be removed in order to gain access to the intake module and vortex module that are housed within the base cover and the lower cover. As discussed previously, this access in some embodiments would allow for removal of these components from the cover, for example, for inspection, replacement, and/or repair.

Figure 19A:
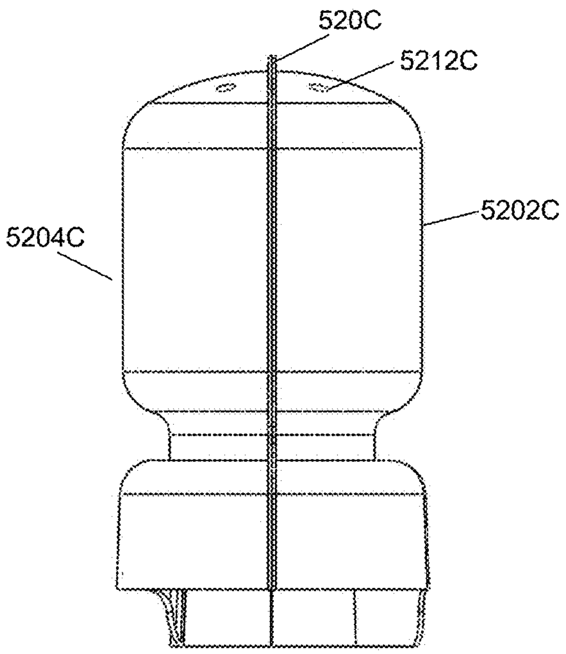
FIGS. 19A-19C illustrates an alternative housing module according to an embodiment of the invention.
Figure 19B:
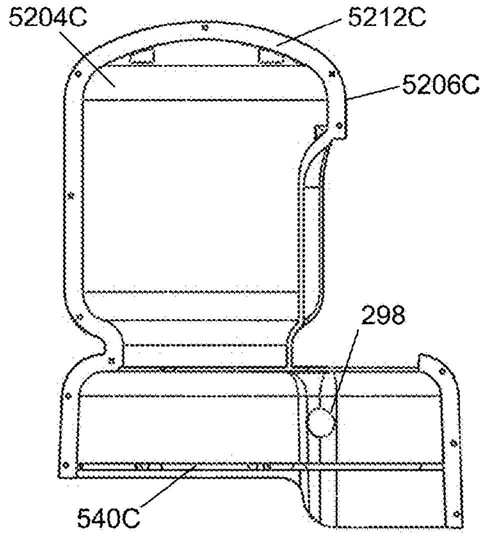
Figure 19C:
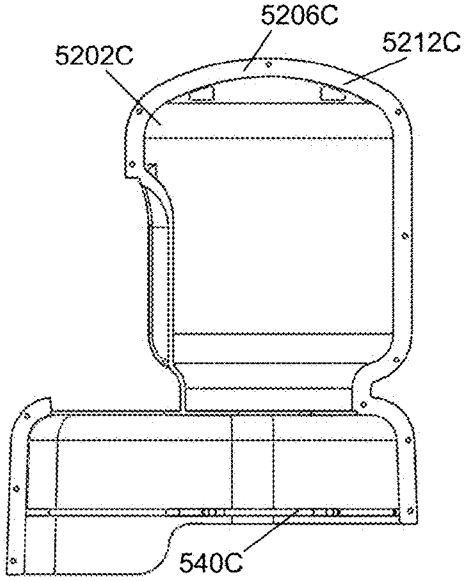

FIGS. 19A-19C illustrate another approach for the cover 520C that includes two halves 5202C, 5204C of the cover that are substantially mirrors of each other except for the inclusion of an optional opening 298 for the optional supplemental inlet to pass. The illustrated cover includes what previously has been illustrated as a cover, a lower cover, and a lower plate (see, e.g., FIGS. 13-15). An alternative embodiment would be to omit the lower plate 540C from the other components in the cover 520C. In at least one embodiment, the covers 5202C, 5204C include a flange (or alternatively a plurality of attachment ears) 5206C with a plurality of mounting holes to attach and secure the two covers 5202C, 5204C together. FIGS. 19A-19C also illustrate the presence of optional mounting bosses 5212C for securing to any support members that are present and the illustrated mounting bosses 5212C provide an example of how these might be arranged if present.

Based on this disclosure, one of ordinary skill in the art will appreciate that there are a variety of ways that the cover may be configured for assembly and manufacturing.

Figure 20:
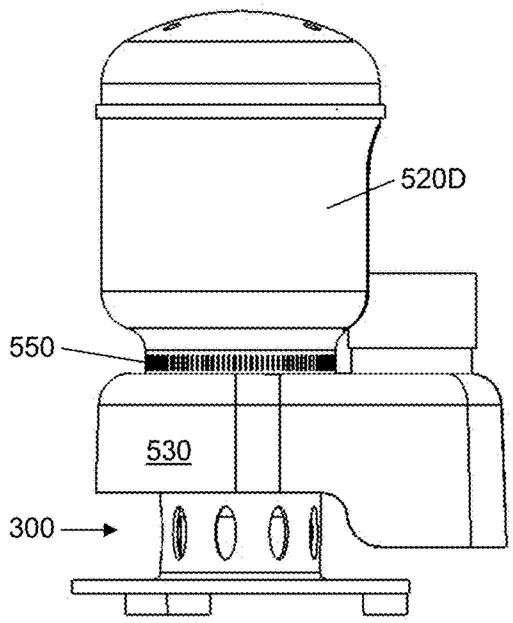
FIG. 20 illustrates a side view of a system with a cylinder filter according to an embodiment of the invention.

FIGS. 20-22B illustrate optional filter/screen alternative embodiments for blocking debris that may be present in the water from entering the system. FIG. 20 illustrates a substantially cylindrical screen 550 fitted between the cover 520D and the lower cover 530 (i.e., over opening 522) to allow water to be drawn through it for processing by the system while blocking debris larger than the openings (or slots) present in the screen 550. In at least one embodiment, the screen 550 includes a plurality of evenly spaced vertical slots.

Figure 21A:
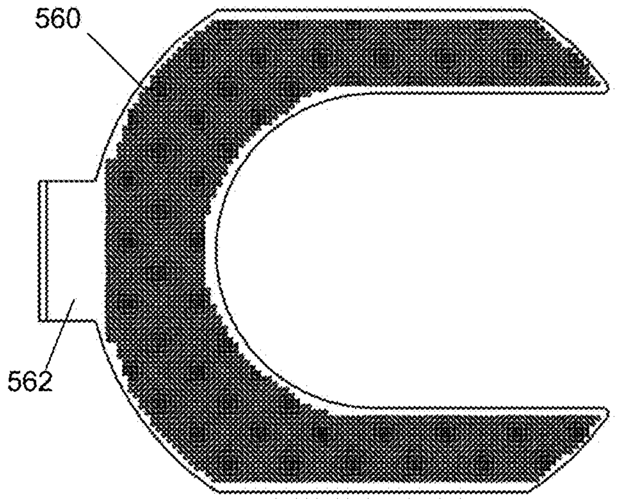
FIG. 21A illustrates a screen for use in at least one embodiment according to the invention.
Figure 21B:
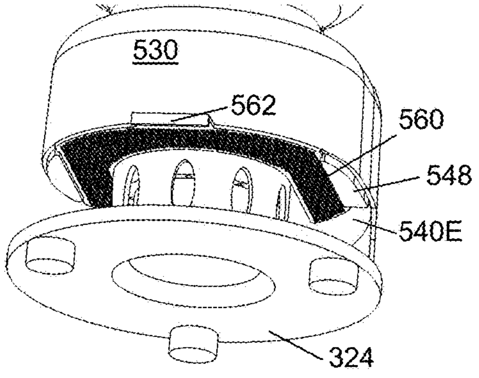
FIGS. 21B and 21C illustrate the screen installed in a system according to an embodiment of the invention.
Figure 21C:
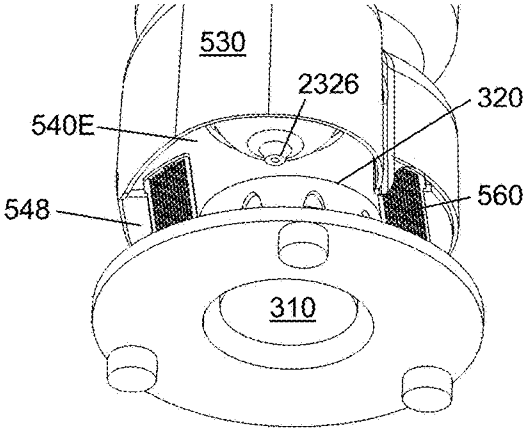

FIGS. 21A-21C illustrate a different screen 560 that is substantially flat and is illustrated as being U-shaped to fit around the motor housing 320. Either the lower plate 540E (illustrated in FIGS. 21B and 21C) or the lower cover 530 (not illustrated) includes a flange member (or bracket) 548 on either side to receive the screen 560 and hold it in place. In at least one embodiment, the screen 560 includes a handle 562 that allows for easier insertion and removal of the screen 560 from the system. FIG. 21C also illustrates how in at least one embodiment, the lower plate 540E does not include openings passing through it outside the area over which the screen 560 covers.

Figure 22A:
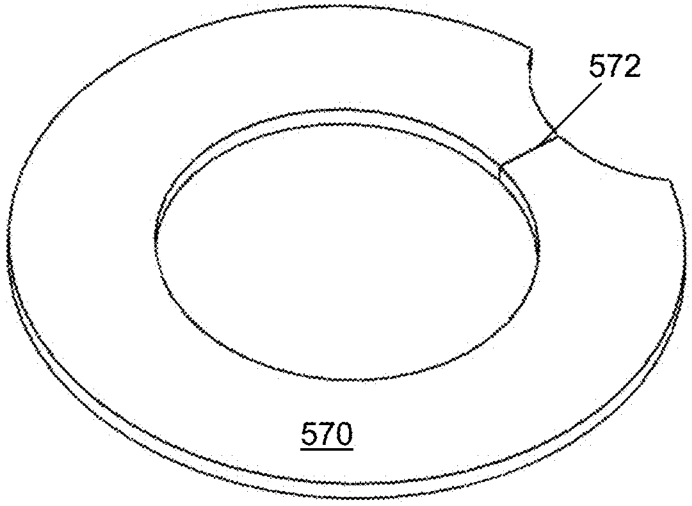
FIG. 22A illustrates a filter sponge (or other filter medium) for use in at least one embodiment according to the invention.
Figure 22B:
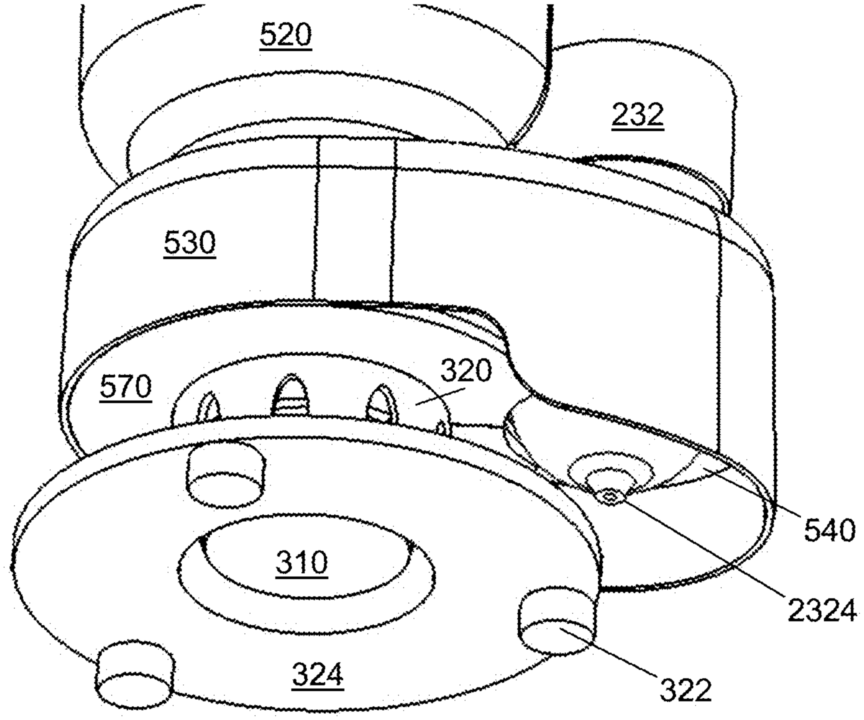
FIG. 22B illustrates the filter sponge installed in a system according to an embodiment of the invention.

FIGS. 22A and 22B illustrate another embodiment that uses a filter material 570 that is porous and allows for water to pass through it. Examples of such material include swamp (or evaporative) cooler wetting material and/or a filter-sponge. In a further embodiment, the filter material 570 includes interweaved wire or other support structure to improve the integrity of the material. In at least one embodiment, the filter material 570 includes a slit (or cut) 572 that improves the ability to insert the filter material 570 into the space defined by the lower plate 540 and the lower cover 530 while fitting around the motor housing 320 that houses motor 310. In a further embodiment, the filter material 570 includes a cut-out to fit around the discharge chamber 2324 that extends into the lower cover 530.

The above screens and filter material are collectively examples of means for filtering. In further embodiment, the means for filtering includes the various openings and inlets present in the housing modules 500 discussed above.

Figure 23A:
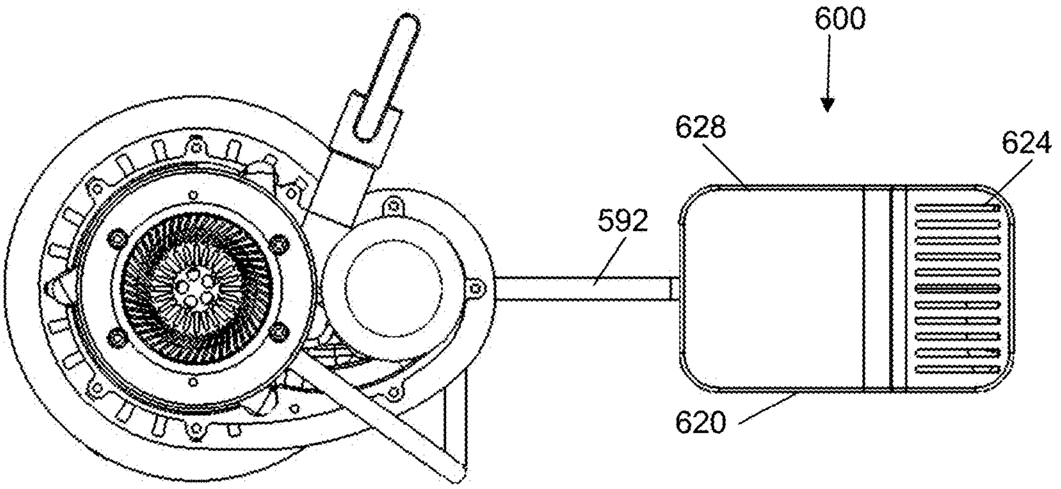
FIGS. 23A and 23B illustrate another embodiment according to the invention.
Figure 23B:
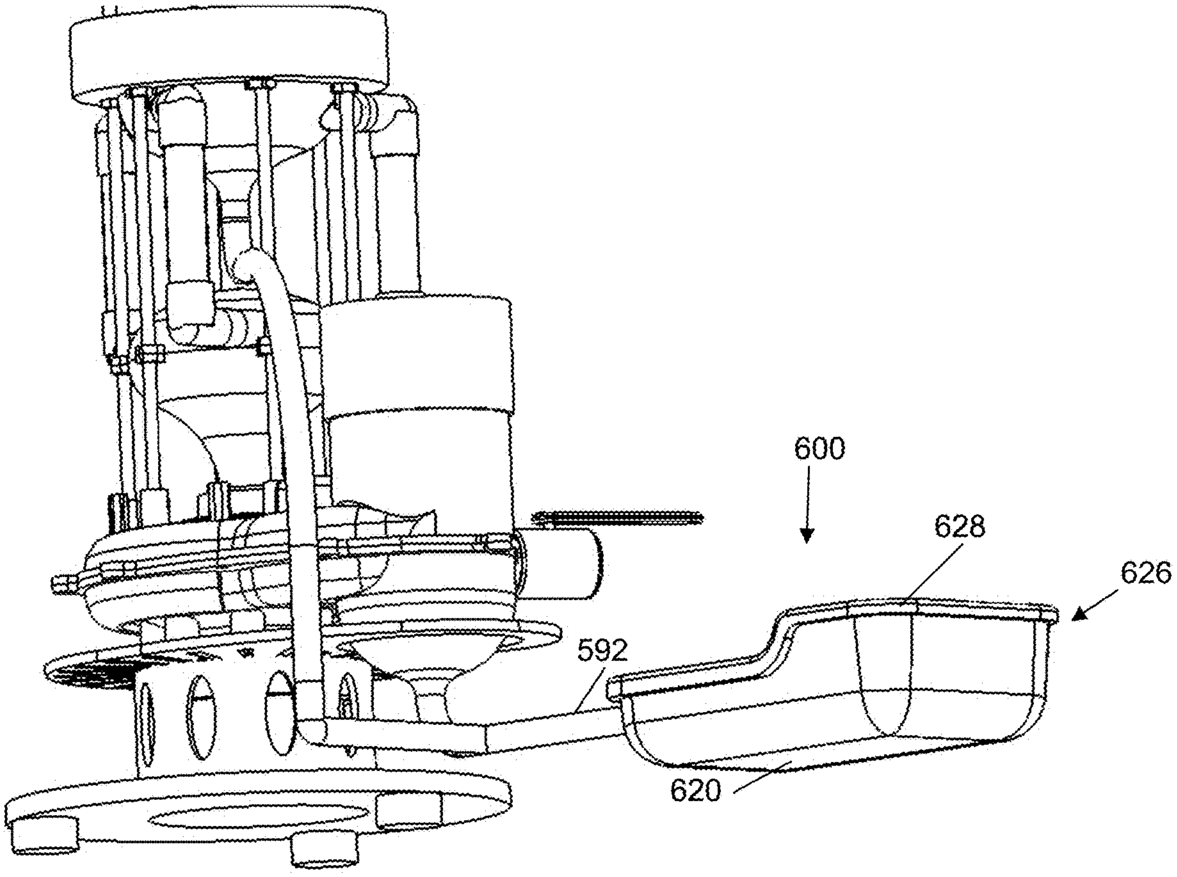
Figure 24A:
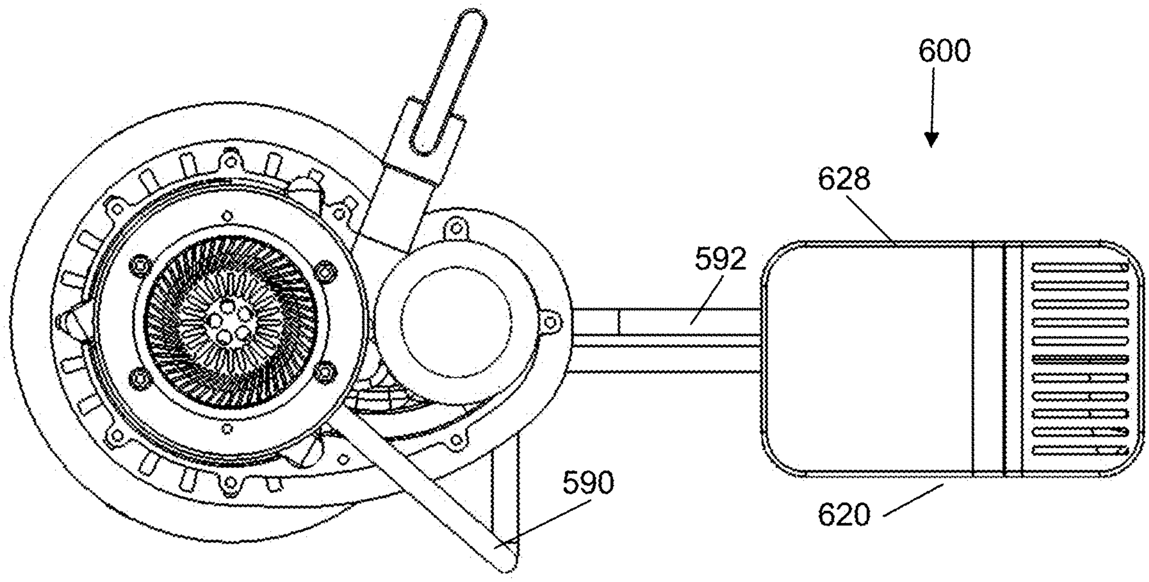
FIGS. 24A and 24B illustrate another embodiment according to the invention.
Figure 24B:
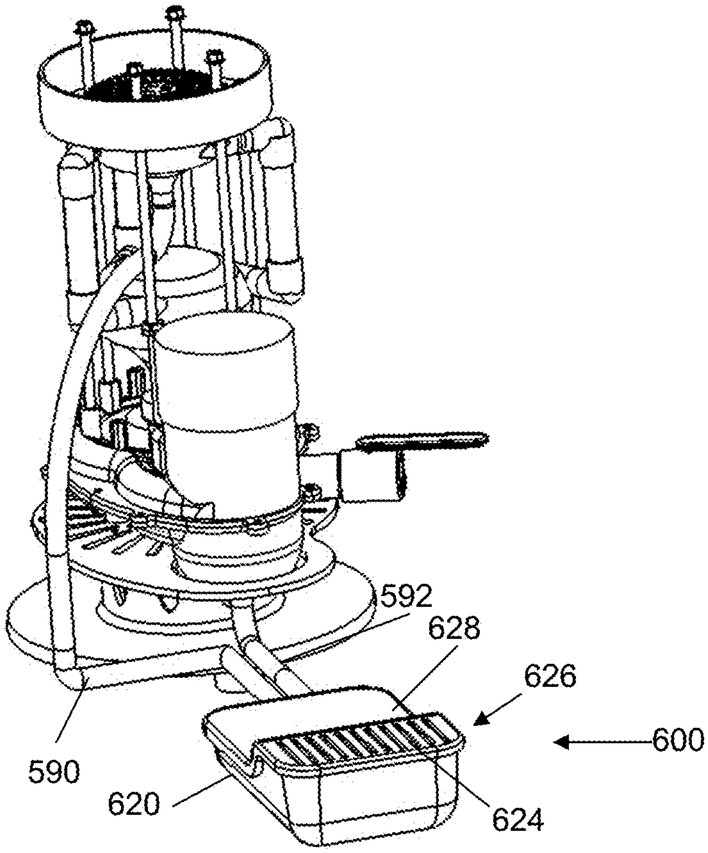

FIGS. 23A-24B illustrate two different examples of how to connect the conduits 590, 592 to the precipitate collection module 600. FIGS. 23A and 23B illustrate a Y-connection between the conduits with just one conduit running into the precipitate collection container 600. In contrast, FIGS. 24A and 24B illustrate conduits 590, 592 running individually into the precipitate collection module 600. In at least one embodiment, the conduits would have their own dedicated precipitate collection containers.

Figure 25:
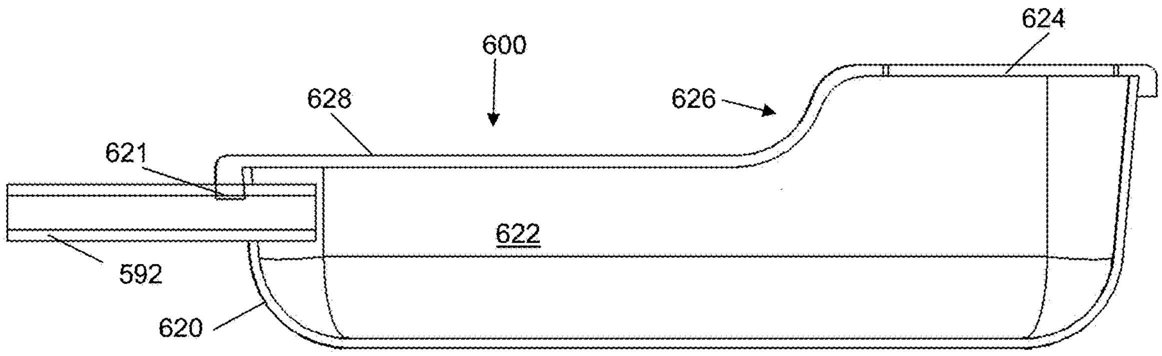
FIGS. 25-27 illustrate different precipitate collection container embodiments according to the invention.
Figure 26:
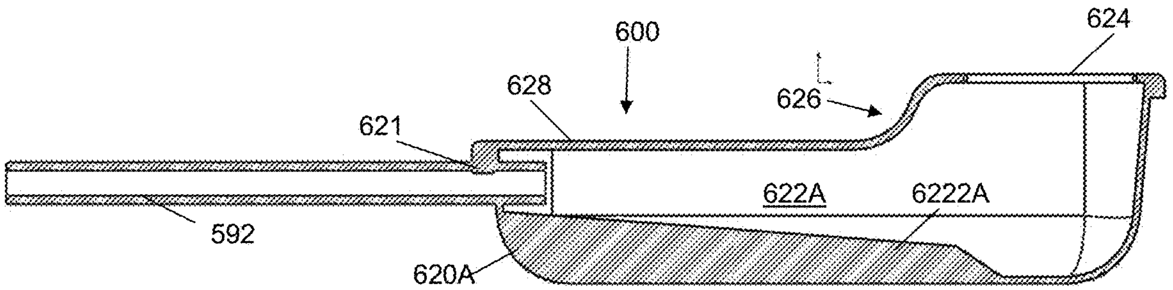
Figure 27:
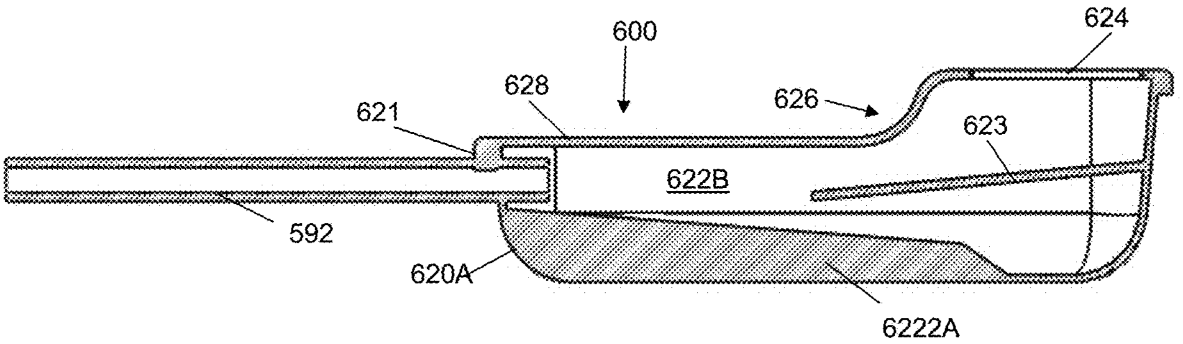

FIGS. 25-27 illustrate different optional precipitate collection modules 600 having a precipitate collection container 620 according to the invention. FIGS. 23A-24B illustrate an example of a precipitate collection container 620 connected to an embodiment of the system; however, based on this disclosure it should be appreciated that the different precipitate collection modules 600 could be attached to the various embodiments for the system discussed in this disclosure along with other water treatment systems having a precipitated discharge. One of ordinary skill in the art should realize that the precipitate collection container 620 can take a variety of shapes and forms beyond that illustrated in FIGS. 25-27 while still providing a cavity 622 to receive, for example, particulate, precipitated matter and/or concentrated solids or similar material and a screened discharge (or screen) 624 such as that illustrated on an exit port 626. In an alternative embodiment, the raised portion is a taller pipe structure (or riser) 626C extending up from the rest of the precipitate collection container 620C illustrated, for example, in FIG. 28. In the illustrated embodiments of FIGS. 23A-27, a screen 624 is included to allow for water to pass through while preventing the material from passing back out into the water being processed.

FIGS. 25-27 illustrate cross-sections of example embodiments for the precipitate collection container 620 where the cross-section taken along their lengths. FIGS. 25-27 illustrate an inlet 621 at the end of the precipitate collection container 620 opposite where the screen 624 and/or exit port 626 are located. Based on this disclosure, it should be appreciated that the exit port 626 extending above the cover 628 may be omitted. FIG. 25 illustrates the precipitate collection container 620 having an inlet 621 through which the conduit 592 attaches to provide a fluid pathway into the cavity 622 to allow for the accumulation of material in the bottom of the precipitate collection container 620 while water is allowed to exit from the precipitate collection container 620 through, for example, the screen 624 (illustrated as part of the exit port 626). Based on this disclosure, it should be understood that the conduit 592 (although shown as extending into the cavity 622) may instead have a connection point external to the cavity 622 such as through a hose connecter or other mechanical engagement. FIG. 25 also illustrates a further optional embodiment for the precipitate collection container 620 where it includes a lid 628 that can be removed so that the collected material can be removed from the precipitate collection container 620. FIG. 20 illustrates another embodiment of the precipitate collection container 620A having a bottom 6222A of the cavity 622A with a slight gradient from the inlet 621 down towards the exit port 626. FIG. 27 illustrates the embodiment from FIG. 26 where the precipitate collection container 620B includes the addition of a screen projection (or wall) 623 extending from the wall opposite of the inlet 621 into the cavity 622B. The screen projection 623 although illustrated as extending at an angle, could instead be substantially horizontal. The screen projection 623 acts as a further barrier to the material escaping from the precipitate collection container 620.

Figure 28:
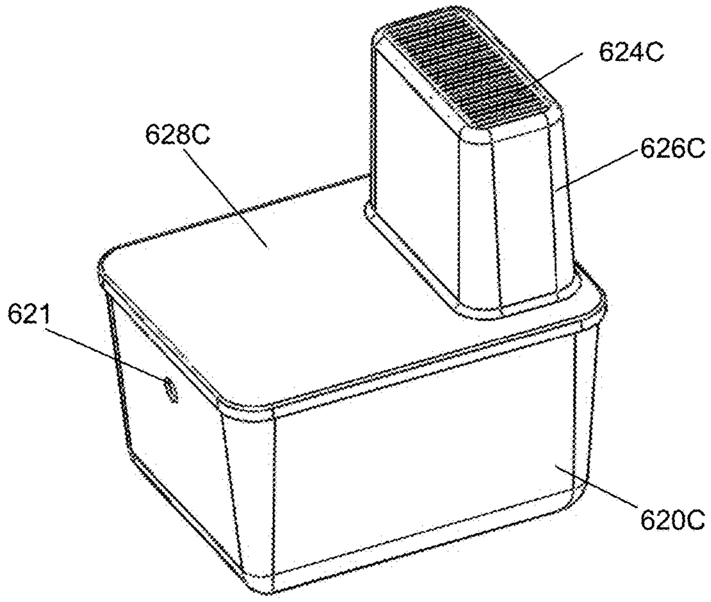
FIG. 28 illustrates a further precipitate collection container embodiment according to the invention.

FIG. 28 illustrates an alternative precipitate collection container 620C that includes an inlet 621 that can take the forms discussed above for the inlet. It should be appreciated that additional inlets could be added to accommodate additional conduits or alternatively the inlet could include a manifold attachment for connection to multiple conduits. The illustrated precipitate collection container 620C further includes a lid 628C on which is a riser 626C, which is an example of an exit port, with a screen 624C along its top surface to allow for the flow of water through the precipitate collection container 620C up through the riser 626C while the material is collected inside the device. The various internal configurations discussed for FIGS. 25-27 could also be present within the precipitate collection container 620C.

Figure 29A:
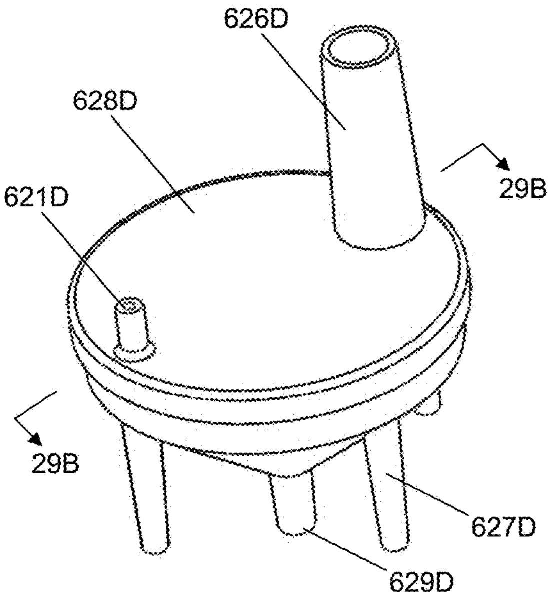
FIGS. 29A and 29B illustrate a further precipitate collection container embodiment according to the invention.
Figure 29B:
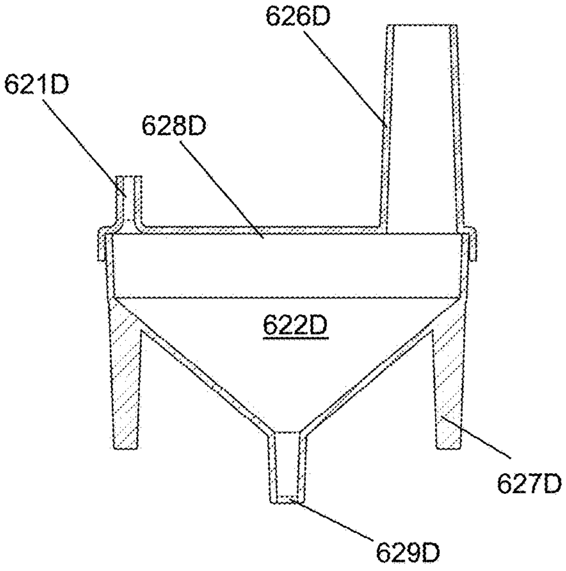

FIGS. 29A and 29B illustrate a funnel shaped precipitate collection container 620D with a whirlpool chamber 622D present within it. Like the previous embodiments, the precipitate collection container 620D includes an inlet 621D for connection to a conduit. It should be appreciated that additional inlets could be added to accommodate additional conduits or alternatively the inlet could include a manifold attachment for connection to multiple conduit. The illustrated precipitate collection container 620D includes a lid 628D on which a riser 626D extends up from to allow for the flow of water through the precipitate collection container 620D while the material is collected inside the device. The funnel shape of the cavity 622D with a particulate port 629D extending from the bottom of the cavity 6222D encourages the formation of a whirlpool, which will pull any material present in the cavity 6222D into a downward flow to drain out the particulate port into another cavity or out of the environment in which the system is running. In a further embodiment, the particulate port 629D includes a valve that can be open to drain any material that has collected in the cavity 6222D as part of a flush operation using the water present in the system to flush the material out of the particulate port 629D. FIG. 33 illustrates an example of the precipitate collection container 620D installed in a water storage tank with the particulate port 629D passing out through the bottom of the tank. In a further embodiment, there are multiple inlets and risers evenly spaced about the cover in an alternating pattern. In a still further embodiment, the inlets and/or risers are angled relative to the cover. FIGS. 29A, 29B, and 33 also illustrate an alternative embodiment of the precipitate collection container 620D having a plurality of legs 627D to in part stabilize the precipitate collection container 620D against a surface.

In a further embodiment to the above precipitate collection container embodiments, a diffuser in fluid communication with the conduit is present within the cavity to spread the water and material coming into the cavity out from any direct stream of water and/or material that might otherwise exist. Examples of a diffuser are a structure that expands out from its input side to its output side, mesh or other large opening screen, and steel wool or other similar material with large pores.

In a further embodiment, the precipitate collection container would be replaced by a low flow zone formed in the environment from which the water is being pulled, for example a water tank.

Figure 13:
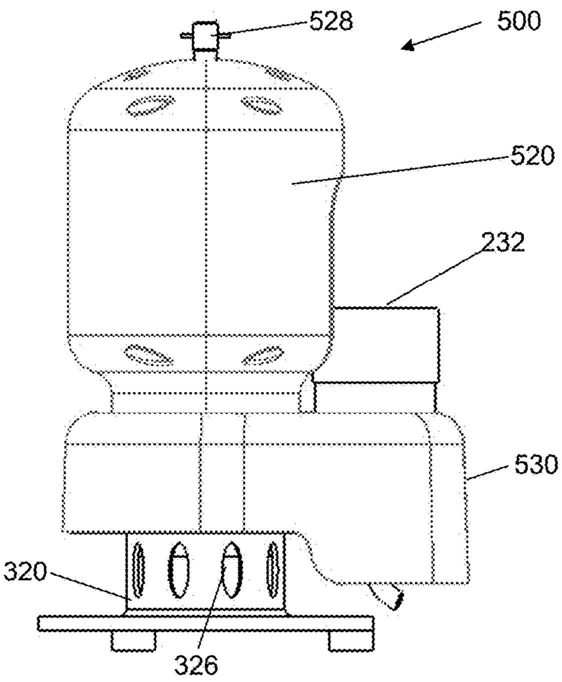
FIG. 13 illustrates an alternative embodiment according to the invention.

FIG. 13 illustrates an optional embodiment that adds an air release valve 528 proximate the top of the cover 520. In at least one embodiment, the air release valve 528 is used to allow air to escape from the system upon it first being placed in the water. The air release valve 528 is an optional add-on for the above-described embodiments. In at least one embodiment, the air release valve provides an easy and controllable way for air to be purged from the system during installation and/or refilling of the environment in which it is placed. In a further embodiment it assists in priming the system for operation. FIG. 13 also illustrates an embodiment where the cover 520 attaches, connects, or abuts a lower cover 530 to establish a flow path from below the lower cover through the openings 542 of the lower plate 540 illustrated in FIG. 15 up through the top of the lower cover 530 illustrated in FIG. 14 and up through the cover 520. The openings 542, 532 in the lower plate 540 and top of the lower cover 530 provide additionally filtering/screening of debris that is larger than the openings preventing the debris from flowing into the system and reducing the likelihood of clogging the system during operation.

Figure 14:
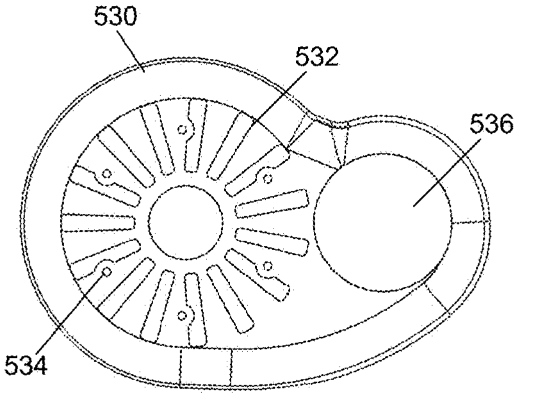
FIG. 14 illustrates a top view of a lower cover according to the embodiment of the invention illustrated, for example, in FIG. 13.
Figure 15:
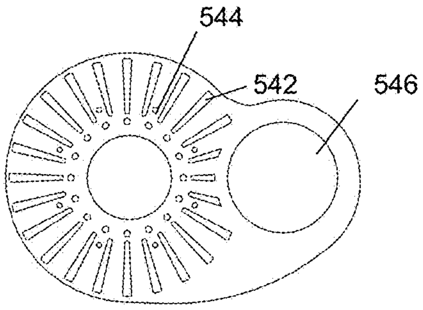
FIG. 15 illustrates a top view of a bottom plate according to the embodiment of the invention illustrated, for example, in FIG. 13.

Both the lower cover 530 and the lower plate 540 include examples of mounting holes 534, 544 present in them as illustrated, for example, in FIGS. 14 and 15, respectively. A variety of mounting holes may be present to facilitate connection with other components in the system such as the support members 524, 526, the disk pack housing 220 and as discussed above supplemental screening and/or filter material. Both the lower cover 530 and the lower plate 540 include an opening 536, 546 passing through at least one surface to fit around the discharge outlet 232 as illustrated, for example, in FIGS. 14 and 15, respectively. In at least one embodiment, these openings 536, 546 facilitate fitting these housing components around the discharge outlet.

Figure 7:
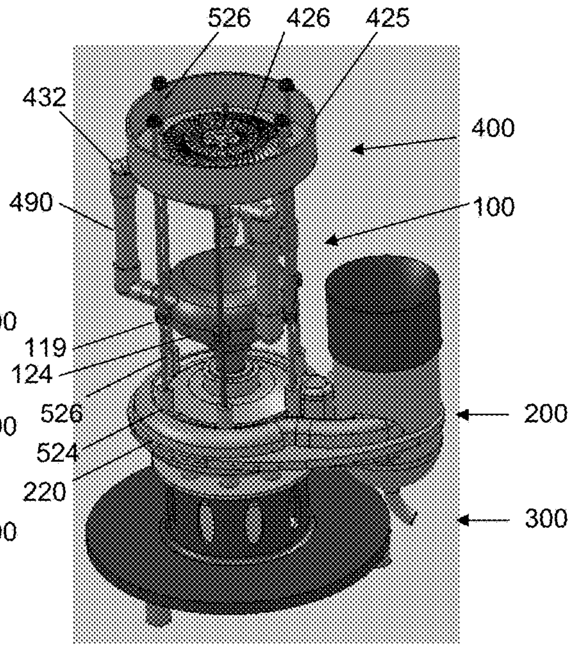
FIGS. 7-9 illustrate a variety of views of the embodiment illustrated in FIGS. 1-4 without a housing module including perspective and side views.
Figure 8:
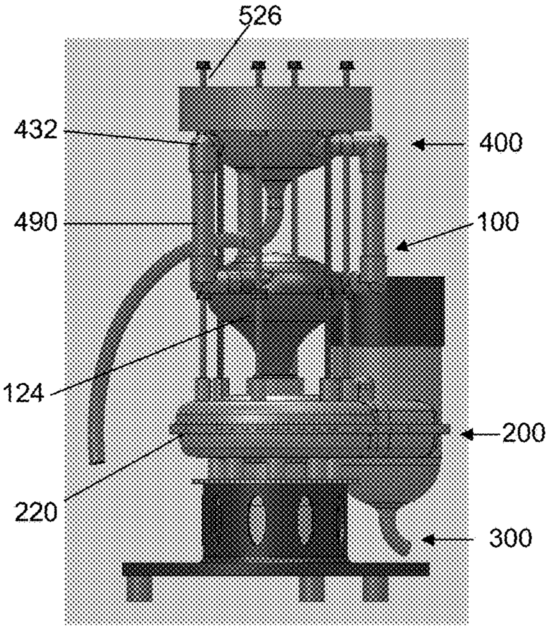
Figure 9:
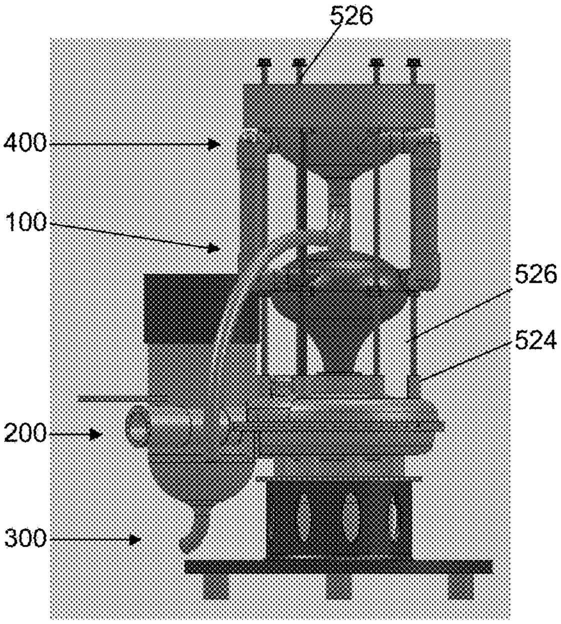

In a further embodiment to the above-described embodiments, the cover 520 is omitted as illustrated, for example, in FIGS. 7-9. One adjustment to the system depicted in these figures is that the support members 526 would be shortened to provide a flush surface on the top for the intake catch 425 and/or the intake screen 426. In a further embodiment, the support members 526 would stop at the vortex housing 120 and conduits 490 would at least partially support the intake housing 420 as illustrated, for example, in FIG. 10.

FIGS. 30A-30C provide an illustration of an alternative wing shim a plurality of spacers 272N and a hexagonal support member 276M connecting them and providing alignment of the spacers 272N relative to the support member 276M and the disk 260N. The spacers 272N include a hexagonal opening passing through it to allow it to slide over the support member 276N. The disks 260N include a plurality of hexagonal openings 2602N. The support members 276N extend between the top and lower rotors and in at least one embodiment are attached to the rotors using screws or bolts. Based on this disclosure, one of ordinary skill in the art will appreciate that the cross-section of the support members may take different forms while still providing for alignment of the spacers 272N relative to the disks 260N.

In a further embodiment to at least one of the previously described embodiments, the disk-pack turbine includes a plurality of disks having waveforms present on them as illustrated in FIGS. 31A-32E. Although the illustrated waveforms are either concentric circles (FIGS. 31A and 31B) or biaxial (FIGS. 32A-32E), it should be understood that the waveforms could also be sinusoidal, biaxial sinucircular, a series of interconnected scallop shapes, a series of interconnected arcuate forms, hyperbolic, and/or multi-axial including combinations of these that when rotated provide progressive, disk channels with the waveforms being substantially centered about an expansion chamber. The shape of the individual disks defines the waveform, and one approach to creating these waveforms is to stamp the metal used to manufacture the disks to provide the desired shapes. Other examples of manufacture include machining, casting (cold or hot), injection molding, molded and centered, and/or electroplating of plastic disks of the individual disks. The illustrated waveform disks include a flange 2608, which may be omitted depending on the presence and/or the location of the wings, around their perimeter to provide a point of connection for wing shims 270 used to construct the particular disk-pack turbine. In a further embodiment, the wing shims 270 are located around and proximate to the expansion chamber in the disk turbine. In a further embodiment, the wing shims are omitted and replaced by, for example, stamped (or manufactured, molded or casted) features that provide a profile axially and/or peripherally for attachment to a neighboring disk or rotor.

In a variety of embodiments the disks have a thickness less than five millimeters, less than four millimeters, less than three millimeters, less than and/or equal to two millimeters, and less than and/or equal to one millimeter with the height of the disk chambers depending on the embodiment having approximately 1.3 mm, between 1.3 mm to 2.5 mm, of less than or at least 1.7 mm, between 1.0 mm and 1.8 mm, between 2.0 mm and 2.7 mm, approximately 2.3 mm, above 2.5 mm, and above at least 2.7 mm. Based on this disclosure it should be understood that a variety of other disk thickness and/or disk chamber heights are possible while still allowing for assembly of a disk-pack turbine for use in the illustrated systems and disk-pack turbines. In at least one embodiment, the height of the disk chambers is not uniform between two neighboring nested waveform disks. In a still further embodiment, the disk chamber height is variable during operation when the wing shims are located proximate to the center openings.

Figure 32A:
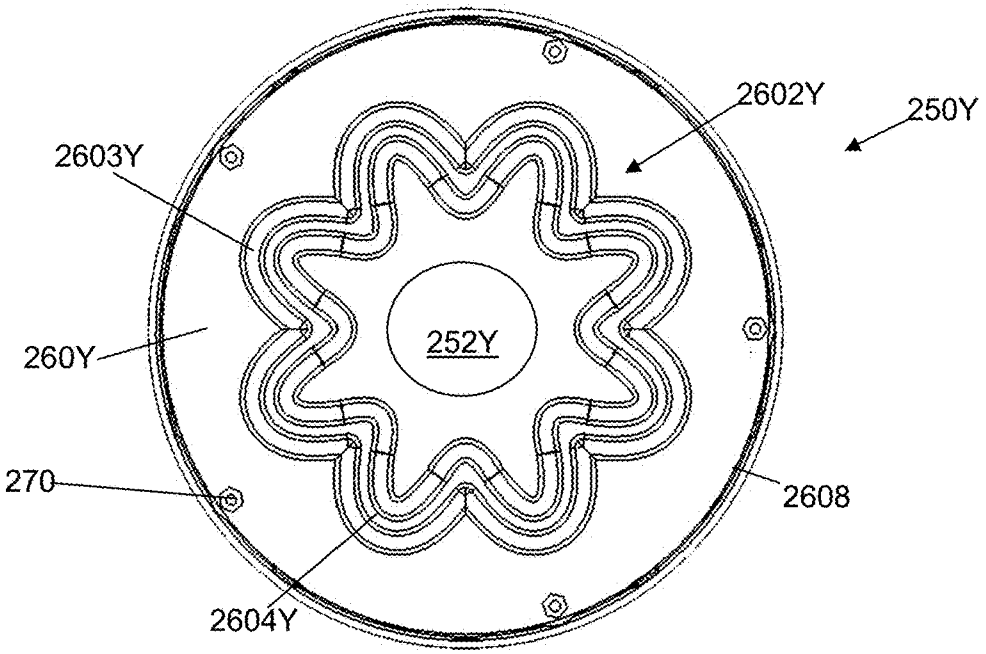
Figure 32B:
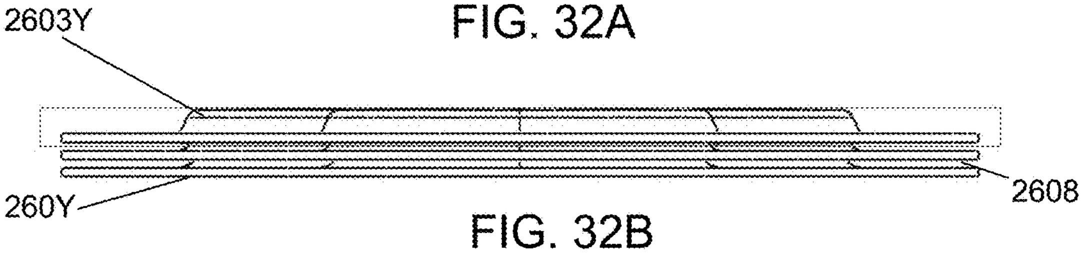
Figure 32C:
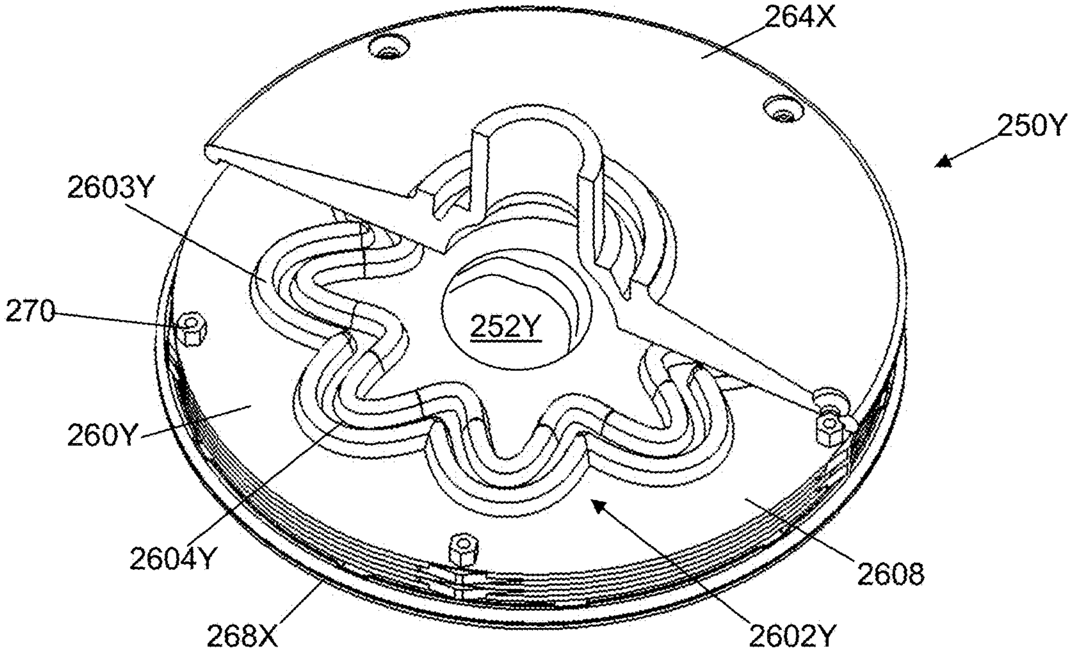
Figure 32D:
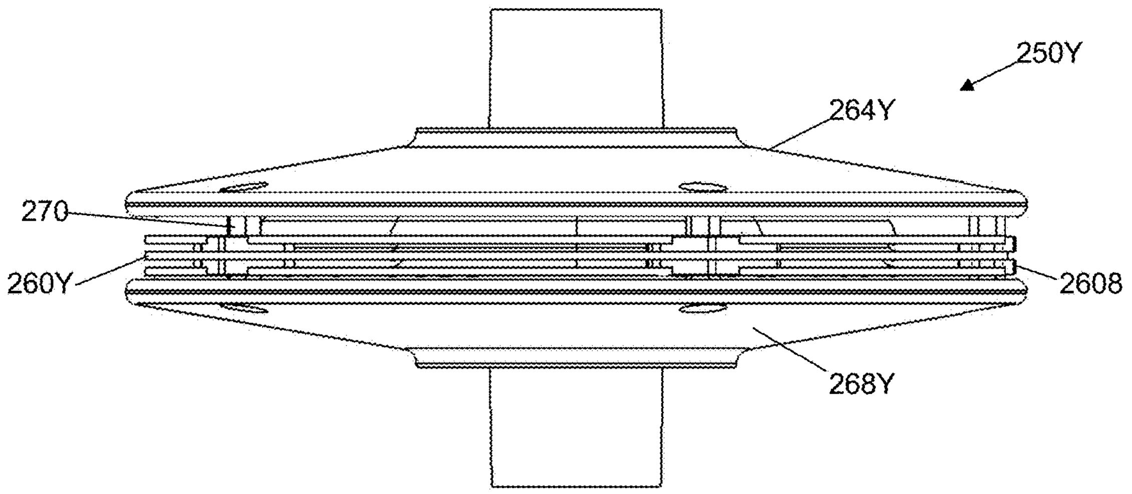
Figure 32E:
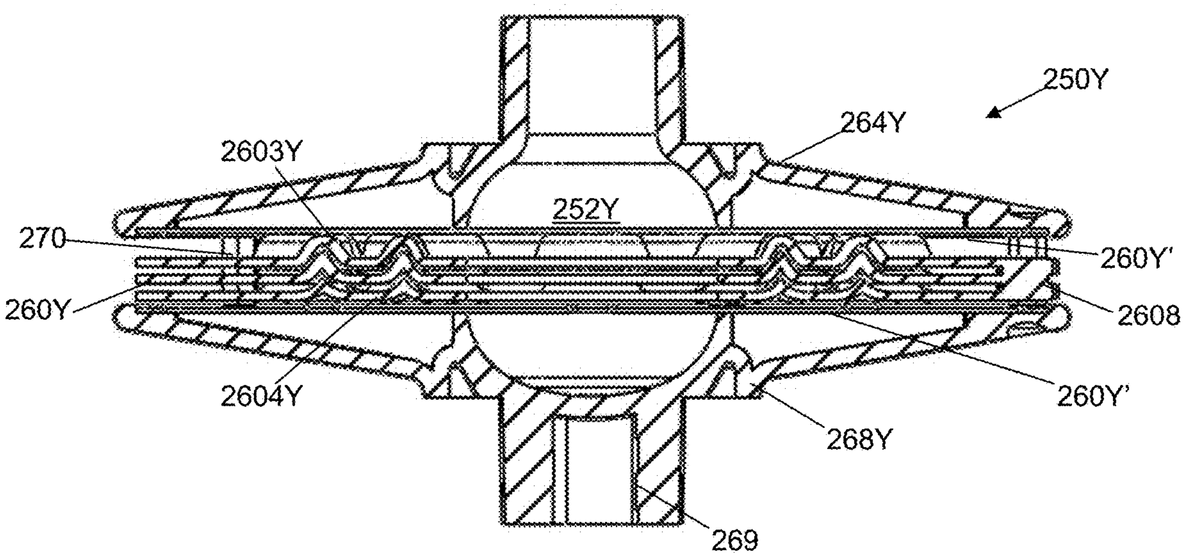

FIGS. 31A-32E illustrate respective disk-pack turbines 250X, 250Y that include an upper rotor 264X and a lower rotor 268X that have a substantially flat engagement surface (other than the expansion chamber elements) facing the area where the disks 260X, 260Y are present. In an alternative embodiment illustrated in FIG. 32E, the disk-pack turbine includes an upper rotor 264Y and a lower rotor 268Y with open areas between their periphery and the expansion chamber features to allow the waveforms to flow into the rotor cavity and thus allow for more disks to be stacked resulting in a higher density of waveform disks for the disk-pack turbine height with the omission of substantially flat disks 260Y' that are illustrated as being covers over the open areas of the rotors 264Y, 268Y. FIG. 32E also illustrates an alternative embodiment where there is a mixture of substantially flat disks 260Y' and nested waveform disks 260Y. FIGS. 31A-32E illustrate how the waveforms include descending thickness waves in each lower disk. In at least one embodiment, the waveforms are shallow enough to allow substantially the same sized waveforms on neighboring disks.

FIG. 31A illustrates a side view of an example of the circular waveform disk-pack turbine 250X. FIG. 31B illustrates a cross-section taken along a diameter of the disk-pack turbine 250X and shows a view of the disks 260X. Each circle waveform is centered about the expansion chamber 252X. The illustrated circle waveforms include two ridges 2603X and three valleys 2604X. Based on this disclosure, it should be appreciated that the number of ridges and valleys could be reversed along with be any number greater than one limited by their radial depth and the distance between the expansion chamber 252X and the flange 2608.

FIG. 32A illustrates a top view of a disk-pack turbine 250Y without the top rotor 264X to illustrate the biaxial waveform 2602Y, while FIGS. 32B-32E provide additional views of the disk-pack turbine 250Y. FIGS. 32A-32E provide an illustration of the waveforms rising above the disk while not dropping below the surface (or vice versa in an alternative embodiment). The illustrated biaxial waveform 2602Y that is illustrated as including two ridges 2603Y and one valley 2604Y centered about the expansion chamber 252Y. Based on this disclosure, it should be appreciated that the number of ridges and valleys could be reversed along with be any number greater than one limited by their radial depth and the distance between the expansion chamber 252Y and the flange 2608. FIG. 32B illustrates a side view of three waveform disks 260Y stacked together without the presence of wing shims 270 or the rotors 264X, 268X. FIG. 32C illustrates a partial cross-section of the disk-pack turbine 250Y. FIG. 32D illustrates a side view of the assembled disk-pack turbine 250Y. FIG. 32E illustrates a cross-section taken along a diameter of the disk-pack turbine 250X and shows a view of the disks 260Y.

In a further embodiment to any one of the previously described embodiments, the components are rearranged/reconfigured to change the rotation provided by the system in the opposite direction, for example, for use in the Southern Hemisphere.

FIG. 33 illustrates an alternative embodiment of the system installed in a water storage tank 910, which is partially cut-away to show what is present inside the storage tank. The illustrated system includes the housing module 500, the intake module 400 (not shown), the disk-pack module 200, and the vortex module 100 (not shown) of the previous embodiments. The illustrated system includes an external A/C motor 210A driving the disk-pack turbine through a drive system such as indirect drive linkage including, for example but not limited to, one or more belts (e.g., O-rings) or a transmission linkage that is present in a belt housing 330 that passes through the water storage wall 912 and provides a compartment connecting the driveshaft connected to the disk-pack turbine, which is present in the base 324A, and the motor driveshaft. The illustrated base 324A is representative of a variety of shapes that may be used while providing a cavity in which the disk-pack turbine driveshaft is present and capable of engagement with a belt. The illustrated embodiment places the motor housing 320A external to a storage tank so that the motor does not need to be a submersible motor. If multiple belts are included with the system and the driveshaft from the motor includes a plurality of gears, then the size of the belt is selected to drive the disk-pack turbine at a predetermined set speed. Alternatively, the driveshaft engaging the disk-pack turbine may include the gears in addition or instead of the external driveshaft.

In at least one embodiment the belt housing 330 is sealed and held in place by a gasket 340 that fits snugly around it and engages a cutout (or other opening) created in the water storage tank wall 912. The gasket connection provides an advantageous anchoring point for the system within the water storage tank.

In a further embodiment, the conduits 590 and 592 are routed into the belt housing 330 through holes with gaskets at a point inside the water storage tank and exiting out from the belt housing 330 at a point external to the water storage tank.

Also illustrated in FIG. 33 is an example of a particulate collection container 620D that was previously discussed in connection with FIGS. 29A and 29B. FIG. 33 illustrates how the particulate port 629D will pass through the bottom 914 of the tank 910, which in at least one embodiment includes a gasket or other seal around the particulate port 629D.

In a further embodiment, the system includes a controller that controls the operation of the system. The above-described motor modules may be provided with a variety of operation, control, and process monitoring features. Examples include a switch (binary and variable), computer controlled, or built-in controller resident in the motor module. Examples of a built-in controller include an application specific integrated circuit, an analog circuit, a processor or a combination of these. The controller in at least one embodiment provides control of the motor via a signal or direct control of the power provided to the motor. The controller in at least one embodiment is programmed to control the RPM of the motor over a predetermined time based on time of day/week/month/year or length of time since process start, and in other embodiments the controller responds to the one or more characteristics to determine the speed at which the motor is operated. In a further embodiment, the controller runs for a predetermined length of time after water has been added to the storage tank. In a further embodiment, the controller also controls operation of the supplemental valve 294 when present in an embodiment with a controller.

In at least one embodiment, the controller monitors at least one of the voltage, amperage, watts, hours of run time (current operation period and/or total run time) and speed (rotations per minute (RPM)) of the motor to determine the appropriate level of power to provide to the motor for operation and/or adjust the speed of the motor. Other examples of input parameters include chemical oxygen demand (COD), biological oxygen demand (BOD), pH, ORP, dissolved oxygen (DO), bound oxygen and other concentrations of elements and/or lack thereof and have the controller respond accordingly by automatically adjusting operational speeds and run times.

A prototype built according to at least one embodiment of the invention was placed into a tank having a capacity of at least 100 gallons and substantially filled to capacity with water, which caused the system to be completely submerged in water. The system was started up with submerged lights placed around and aimed at the discharge port to capture the images depicted in FIGS. 34A and 34B, which are both enlarged to the same amount and have light coming from the right side of the image. These images were captured from a slow-motion video taken with a macro lens. FIG. 34A shows the relative size of the vortical solitons that were discharged from the discharge outlet relative in size to an adult male's fingers. The vortical solitons spin and rotate about their centers as they move up and down within the water. The vortical solitons appear to be substantially flat vortex disc that are spinning and moving based on the captured video as represented in the images depicted in FIGS. 34A and 34B. The images include countless pairs of vortical solitons that upon discharge from the discharge outlet 232 wholly saturate the water within a contained environment with each soliton persisting until its energy is discharged via contact with a solid boundary or an obstruction. Although the water is saturated with these vortical packets of rotating energy, each maintains a relative distance of separation from its other soliton in the pair without collision with the other soliton. From review of the video, it appears that the soliton pairs move in complete lockstep with each other as they progress through the water environment while turning and spinning. It is believed that this restructuring of the water allows in part for it to impact the larger volume of water in which the system runs, because these vortical solitons will continue on their respective paths until interfered with by another object such as the wall of the container or other structural feature.

It should be noted that the present invention may, however, be embodied in many different forms and should not be construed as limited to the embodiments and prototype examples set forth herein; rather, the embodiments set forth herein are provided so that the disclosure will be thorough and complete, and will fully convey the scope of the invention to those skilled in the art. The accompanying drawings illustrate embodiments according to the invention.

As used above "substantially," "generally," and other words of degree are relative modifiers intended to indicate permissible variation from the characteristic so modified. It is not intended to be limited to the absolute value or characteristic which it modifies but rather possessing more of the physical or functional characteristic than its opposite, and preferably, approaching or approximating such a physical or functional characteristic. "Substantially" also is used to reflect the existence of manufacturing tolerances that exist for manufacturing components.

The foregoing description describes different components of embodiments being "in fluid communication" to other components. "In fluid communication" includes the ability for fluid to travel from one component/chamber to another component/chamber.

Based on this disclosure, one of ordinary skill in the art will appreciate that the use of "same", "identical" and other similar words are inclusive of differences that would arise during manufacturing to reflect typical tolerances for goods of this type.

Those skilled in the art will appreciate that various adaptations and modifications of the exemplary and alternative embodiments described above can be configured without departing from the scope and spirit of the invention. Therefore, it is to be understood that, within the scope of the appended claims, the invention may be practiced other than as specifically described herein.

I claim:

1. An intake module for use in a water treatment system, the intake module comprising:

an intake catch having a wall and a bottom with an intake screen with a plurality of openings;

an intake housing defining an intake chamber, said intake chamber having a substantially paraboloid shape upper section narrowing to its bottom;

a plurality of intake outlets in fluid communication with said intake chamber; and a solids outlet in fluid communication with said bottom of said intake chamber.

2. The intake module according to claim 1, further comprising a plurality of conduits where each conduit is connected to a respective intake outlet.

3. The intake module according to claim 2, wherein the intake housing includes mounting ears configured to connect to support members.

4. The intake module according to claim 2, wherein each conduit spirals down from said plurality of intake outlets.

5. The intake module according to claim 4, wherein the intake housing includes mounting ears configured to connect to support members.

6. The intake module according to claim 2, wherein each conduit is flexible.

7. The intake module according to claim 6, wherein the intake housing includes mounting ears configured to connect to support members.

8. The intake module according to claim 1, wherein the intake housing includes mounting ears configured to connect to support members.

9. The intake module according to claim 1, wherein said bottom of said intake catch includes an outer flat ring around said intake screen, said intake screen rises above said outer flat ring.

10. The intake module according to claim 9, wherein the plurality of openings in said intake screen are configured as passageways into said intake chamber and said intake screen defines a top of said intake chamber.

11. The intake module according to claim 1, wherein said solids outlet is configured to attach to a conduit.

12. The intake module according to claim 1, wherein said intake chamber is shaped to encourage rotational movement of fluid passing through said intake module resulting in a whirlpool motion to precipitate solids out of the fluid towards said solids outlet.

13. An intake module for use in a water treatment system, the intake module comprising:

an intake catch having a wall and a bottom with an intake screen with a plurality of openings;

an intake housing defining an intake chamber, said intake chamber having an upper section that narrows into a lower section with a solids outlet;

a plurality of intake outlets in fluid communication with said intake chamber and spaced evenly around a periphery of said intake chamber; and wherein said intake screen is a top of said intake chamber.

14. The intake module according to claim 13, wherein said bottom of said intake catch includes an outer flat ring around said intake screen, said intake screen rises above said outer flat ring.

15. The intake module according to claim 14, wherein the plurality of openings in said intake screen are configured as passageways into said intake chamber and said intake screen defines a top of said intake chamber.

16. The intake module according to claim 13, wherein said solids outlet is configured to attach to a conduit.

17. The intake module according to claim 13, wherein said upper section of said intake chamber is shaped to encourage rotational movement of fluid passing through said intake module resulting in a whirlpool motion to precipitate solids out of the fluid towards said solids outlet.

18. The intake module according to claim 13, wherein said upper section of said intake chamber has a substantially paraboloid shape.

19. The intake module according to claim 13, wherein said intake chamber extends into said intake catch.

20. The intake module according to claim 13, wherein the plurality of openings in the intake screen are sized to block material and other debris larger than can pass through the plurality of openings.

* * * * *